US006529234B2

(12) United States Patent
Urisaka et al.

(10) Patent No.: US 6,529,234 B2
(45) Date of Patent: *Mar. 4, 2003

(54) CAMERA CONTROL SYSTEM, CAMERA SERVER, CAMERA CLIENT, CONTROL METHOD, AND STORAGE MEDIUM

(75) Inventors: Shinya Urisaka; Tomoaki Kawai; Kazuko Suzuki, all of Yokohama; Koichi Yano, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,036

(22) Filed: Oct. 14, 1997

(65) Prior Publication Data

US 2001/0024233 A1 Sep. 27, 2001

(30) Foreign Application Priority Data

Oct. 15, 1996 (JP) .............................................. 8-272301
Nov. 29, 1996 (JP) .............................................. 8-320557

(51) Int. Cl.⁷ .............................................. H04N 5/232
(52) U.S. Cl. ........................ 348/213; 348/143; 348/552
(58) Field of Search ................................ 348/207, 211, 348/212, 213, 220, 231, 239, 552, 143, 159, 169; 702/188; 358/442, 403, 408, 909.1, 527; H04N 5/225

(56) References Cited

U.S. PATENT DOCUMENTS 5,760,917 A * 6/1998 Sheridan ..................... 348/211
6,002,995 A * 12/1999 Suzuki et al. ............... 348/143

OTHER PUBLICATIONS co–pending U.S. Appln. Ser. No. 08/603,611.
co–pending U.S. Appln. Ser. No. 08/607,687.
co–pending U.S. Appln. Ser. No. 08/802,065.

* cited by examiner

Primary Examiner—Tuan Ho
(74) Attorney, Agent, or Firm—Morgan & Finnegan, L.L.P.

(57) ABSTRACT

In a system in which a plurality of cameras and microphones, the image pickup directions and audio input directions of which can be remote-controlled, are arranged on a network, when an image pickup inhibited region is set, and when a network client remote-controls a certain camera to pickup a range including the image pickup inhibited region, a portion corresponding to the image pickup inhibited region is not displayed, and sound corresponding to the region is not output.

53 Claims, 24 Drawing Sheets

FIG. 8A

CAMERA MANAGEMENT TABLE

| CAMERA NUMBER | CAMERA NAME | HOST NAME | SETTING POSITION | INITIAL DIRECTION | CURRENT DIRECTION | CURRENT IMAGE PICKUP RANGE (a, A) | IMAGE PICKUP INHIBITED REGION | PRESENCE / ABSENCE OF MICROPHONE |
|---|---|---|---|---|---|---|---|---|
| 1 | CAMERA 1 | HOST 1 | (150, 11) | 180 | 145 | (120, 170) | d, D | PRESENT |
| 2 | CAMERA 2 | | | | | | | ABSENT |

FIG. 8B

| IMAGE PICKUP INHIBITED REGION TABLE | |
|---|---|
| 100, 100, 200, 200 | 2 |
| 500, 200, 800, 400 | 1 |
| ..... | ..... |

FIG. 8C

| USER MANAGEMENT TABLE | |
|---|---|
| URISAKA | 0 |
| KAWAI | 1 |
| SUZUKI | 1 |
| YANO | 2 |
| ..... | ..... |

FIG. 9
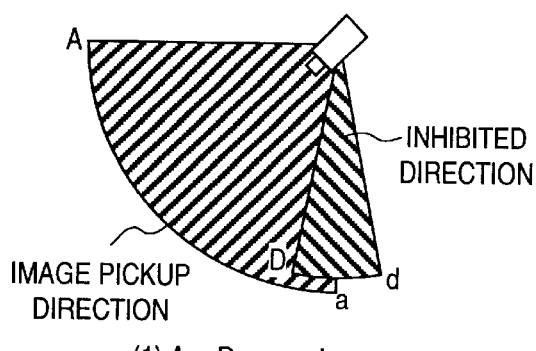
(1) A > D > a > d
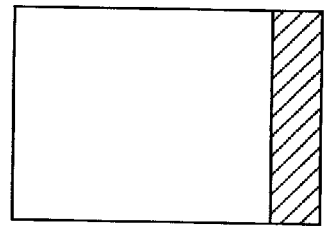
FIG. 10
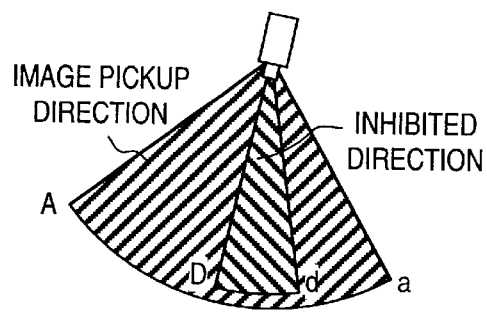
(2) A > D > d > a
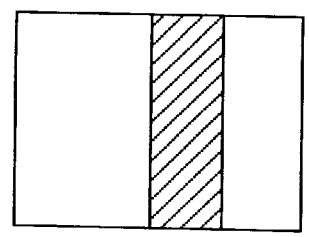

| MICROPHONE NUMBER | MICROPHONE NAME | HOST NAME | SETTING POSITION | INITIAL DIRECTION | CURRENT DIRECTION | DIRECTION OF CURRENT AUDIO INPUT RANGE |
|---|---|---|---|---|---|---|
| 1 | MIKE1 | HOST1 | (150, 11) | 180 | 145 | (120, 170) |
| 2 | MIKE2 | ⋮ | | | | |

FIG. 21

| Kazama | 1 |
| --- | --- |
| Nakagawa | 1 |
| ⋮ | ⋮ |
| Suzuki | 2 |
| Kuramata | 2 |
| ⋮ | ⋮ |
| Eda | 3 |
| Minami | 3 |
| Satoh | 3 |
| ⋮ | ⋮ |

FIG. 22

| Kazama | OFF |
| --- | --- |
| Suzuki | ON |
| Kuramata | OFF |
| — | — |
| ⋮ | ⋮ |

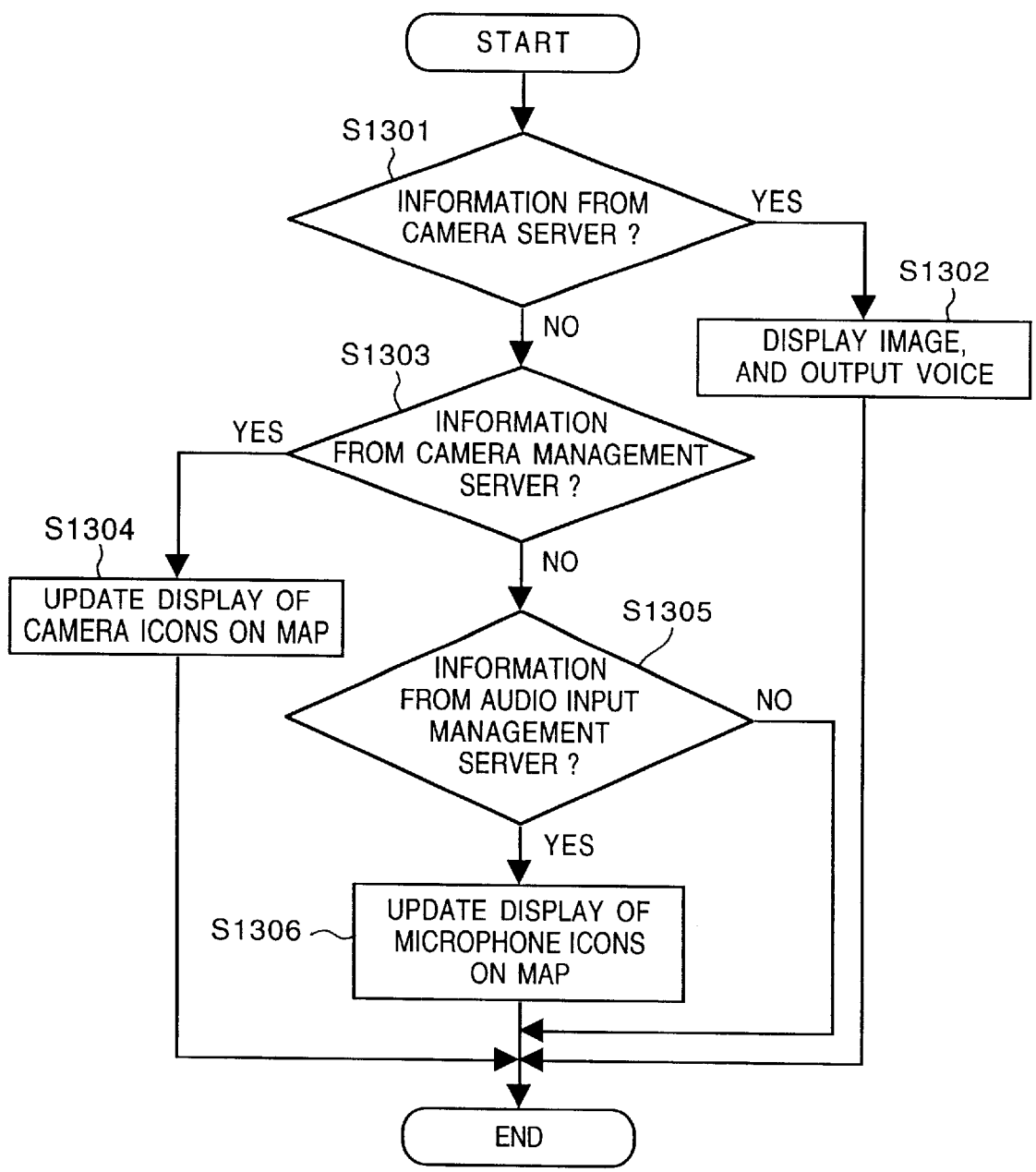

CAMERA CONTROL SYSTEM, CAMERA SERVER, CAMERA CLIENT, CONTROL METHOD, AND STORAGE MEDIUM

BACKGROUND OF THE INVENTION

The present invention relates to a camera control system which allows a plurality of persons to remote-control at least one camera.

In recent years, the assignee of the present applicant has been making extensive studies and developments of a so-called camera control system as a tool for detecting the states at a plurality of remote places.

In this system, cameras, the pan angle, tilt angle, and zooming of which can be remote-controlled, audio input devices for inputting audio data, and image communication terminal devices (servers) for transmitting/receiving image data input by the cameras and audio data input by the audio input devices via a network are set at a plurality of places.

A client's terminal device converts image signals transmitted from the image communication terminal devices at a plurality of places to display images on a monitor, and converts audio signals to output sound to a loudspeaker, thus recognizing the states of the camera locations.

In the above-mentioned camera control system, as the number of cameras to be controlled becomes larger, the user need to recognize the camera locations more easily. For this purpose, a system that superimpose-displays icons representing the cameras on a map screen as indices indicating the positions and directions of the individual cameras has been proposed by the assignee of the present applicant.

In such camera control system, every user who uses the system can freely remote-control cameras connected via the network.

However, with this system, persons within the image pickup range of the remote-controlled cameras are always monitored, and they strongly feel uncomfortable. If the users on the client side can freely remote-control the cameras or audio input devices, the states of the regions, which should be hidden from those users, are detected unwantedly, resulting in poor security. Hence, the system must be built in consideration of such situation.

To solve the above-mentioned problem, the assignee of the present applicant has proposed a control system in which the image pickup inhibited ranges of the respective cameras are set on the map screen to remote control the cameras, thus physically and substantially inhibiting image pickup within those image pickup inhibited ranges.

However, in the conventional camera control system, audio information within the image pickup inhibited ranges may be input unwantedly.

Also, even when the control operations such as panning, tilting, and zooming of the camera are executed, audio information cannot be obtained in correspondence with such control operations of the camera.

SUMMARY OF THE INVENTION

It is an object of the present invention to inhibit an audio input within an image pickup inhibited region. It is another object of the present invention to provide a real audio output corresponding to an image output.

It is still another object of the present invention to provide a camera server which manages clients in units of a plurality of groups, and allows clients belonging to these groups to control cameras within the limitation ranges of the corresponding groups.

It is still another object of the present invention to provide a camera client which is connected to the camera server and allows the user of that client to recognize the restraint contents.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8A to 8C show examples of camera status tables;

FIG. 9 shows a display on the image window when the positional relationship between the camera and the image pickup inhibited range satisfies A>D>a>d;

FIG. 10 shows a display on the image window when the positional relationship between the camera and the image pickup inhibited range satisfies A>D>d>a;

FIG. 11 shows a display on the image window when the positional relationship between the camera and the image pickup inhibited range satisfies D>A>d>a;

FIG. 12 shows a display on the image window in detail when the positional relationship between the camera and the image pickup inhibited range satisfies A>D>d>a;

FIG. 15 shows an example of a microphone status table;

FIG. 21 shows the contents of a permission table in the second embodiment;

FIG. 22 shows the contents of a transmission destination table in the second embodiment;

FIG. 28 is a flow chart showing the processing contents of a client in the first embodiment.

DETAILED DESCRIPTION OF THE PREFERRED EMBODIMENTS

Figure 1:
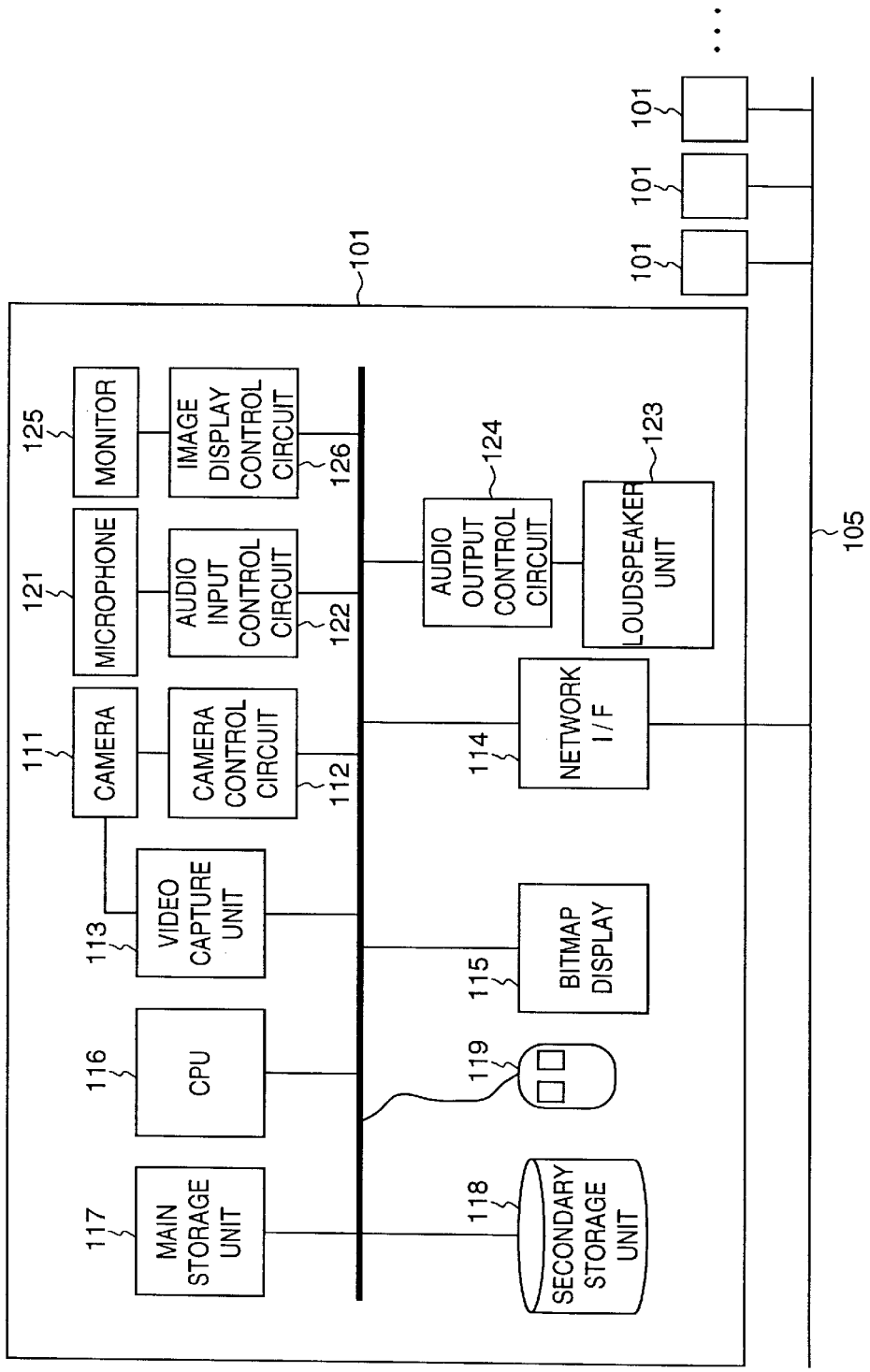
FIG. 1 is a block diagram of a camera control system according to the present invention.

FIG. 1 is a block diagram showing a camera control system according to an embodiment of the present invention.

An image communication terminal device 101 transmits/receives image signals, audio signals, and the like to/from a plurality of other image communication terminal devices 101 via a network 105.

A camera 111 is controlled by a control command and the like sent from another device via the network 105, and senses an image around the image communication terminal device 101 to which the camera 111 is connected. A camera control circuit 112 controls panning, tilting, zooming, focusing, and the like of the camera 111 on the basis of a control command from a CPU 116 or a camera control command sent via the network.

A main storage unit 117 temporarily stores management information read out from a camera management server 202 or a secondary storage device 113.

The secondary storage device 118 comprises, e.g., a hard disk, stores a map, stores, the user name who uses the network, and also stores camera icons as camera index means to be superimposed on the map and their position information, microphone icons as microphone index means and their position information, and the like.

A mouse 119 is a pointing device used by the user to do operations on a monitor 125. A bitmap display 115 allows to run a window display system that displays a plurality of windows.

A video capture unit 113 A/D-converts an image signal input by the camera 111, compresses and codes the digital image signal, and transmits the coded image signal onto the network 105 via a network I/F 114. At this time, multicast or broadcast communications are used so that information can be simultaneously transmitted to a plurality of image communication terminal devices connected to the network.

A microphone 121 has a predetermined directivity range, inputs sound around the image communication terminal device 101 to which the microphone 121 is connected, and converts the input sound into an electrical audio signal. The user can remote-control the audio detection characteristics (directivity, direction, sensitivity) of the microphone 121 via the network 105.

An audio input control circuit 122 controls the directivity, input level, and the like of the microphone 121 in accordance with a command from a computer. Also, the circuit 122 A/D-converts an audio signal from the microphone 121, compresses and codes the digital audio signal, and transmits the coded audio signal onto the network via the network I/F 114.

At this time, the audio signal can be transmitted to a plurality of places simultaneously with the image signal.

Furthermore, the audio input control circuit 122 controls the audio detection characteristics (audio input range, input direction, input sensitivity; to be described later) of the microphone 121 in correspondence with panning, tilting, zooming, and the like of the camera 111. In this embodiment, the camera 111 and the microphone 121 are mounted on a single panhead, so that the microphone 121 points in the same direction as the photographing direction of the camera 111.

The camera control system of this embodiment has the following audio output means. That is, reference numeral 123 denotes a loudspeaker unit for outputting sound. An audio output control circuit 124 expands data transmitted via the network 105, D/A-converts the expanded data, and outputs the analog signal to the loudspeaker unit 123. In this case, upon outputting an audio signal, the audio output control circuit 124 controls the sound field (divergence, direction, depth) of the loudspeaker unit 123 in accordance with a command from the CPU 116. Note that the loudspeaker unit 123 may have a plurality of loudspeakers.

The monitor 125 displays image information input from the camera 111, and also displays a map and the like stored in the secondary storage unit.

An image display control circuit 126 expands an image signal transmitted via the network, D/A-converts the expanded signal, converts the analog image signal into, e.g., an NTSC standardized signal, and displays an image on the monitor 125.

The camera 111, the audio input control circuit 122, and the audio output control circuit 124 can be remote-controlled via the network.

Figure 2:
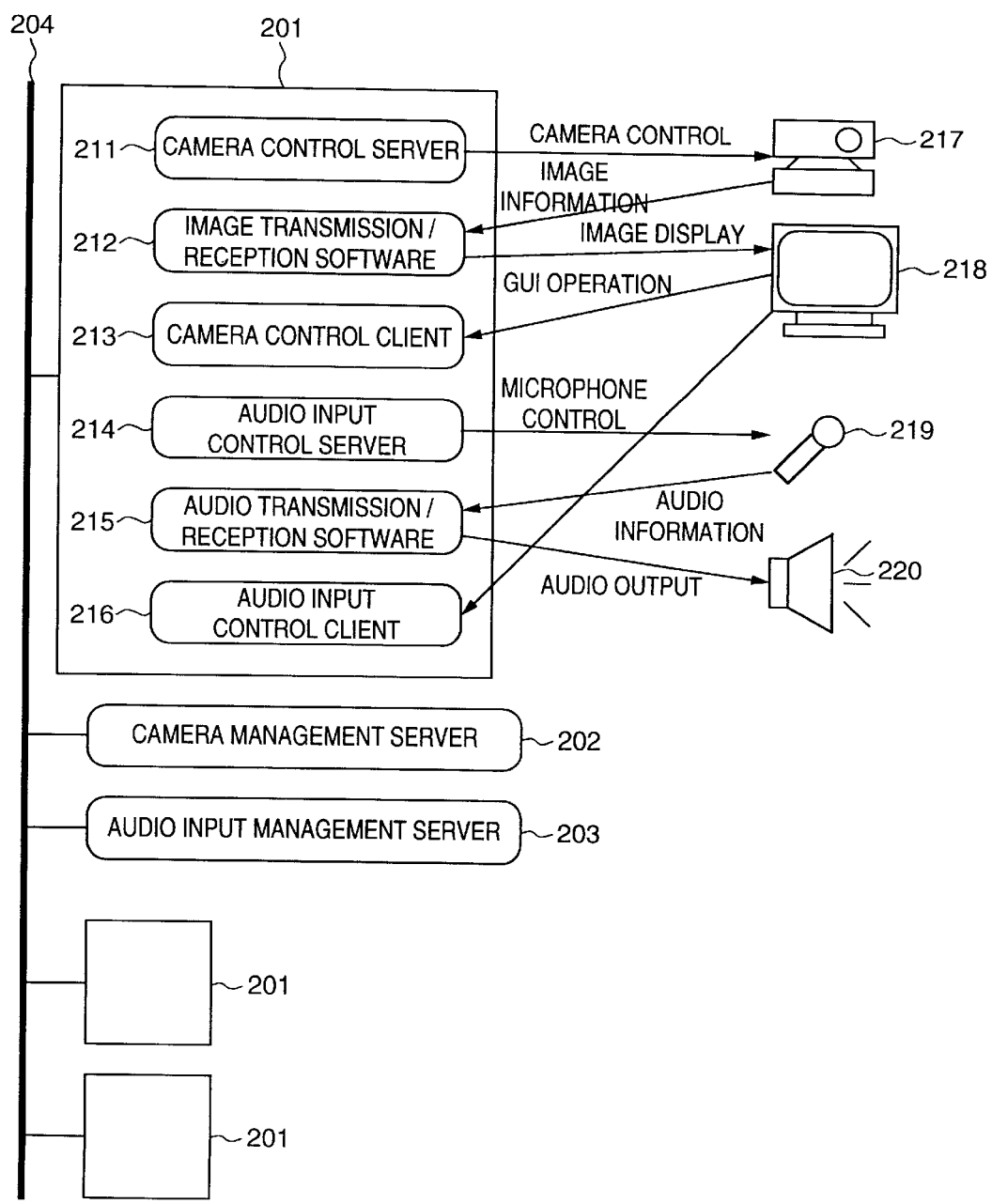
FIG. 2 is a block diagram showing the software configuration of the camera control system according to the present invention.

FIG. 2 is a block diagram showing the software configuration of this embodiment. In FIG. 2, a plurality of image communication terminal devices 201, a camera management server 202 (to be described later), and an audio input management server 203 are connected to a computer network 204.

A camera control server 211 controls a camera 217 of the own terminal in accordance with an operation command of a camera control signal input at the own terminal or obtained via the network.

An image transmission/reception software program 212 displays image information obtained by the camera 217 controlled by the camera control server 211 on the monitor of the image communication terminal device 201 in accordance with the user's operation command, and transmits it to other image communication terminal devices 201.

An audio input control server 214 controls the audio detection characteristics of a microphone 219 in accordance with a control signal input from the image communication terminal device 201 to output sound.

An audio transmission/reception software program 215 supplies audio data to a terminal designated by the user, and supplies an audio signal transferred from another terminal via the network 204 to a loudspeaker 220 of the own terminal.

The camera management server 202 is a software program that manages all the cameras 217 of the image communication terminal devices 201 connected to the network 204, and stores information such as the camera names or host names (user names), the setting positions, current use states and the like of the individual cameras 217.

The camera management server 202 not only manages registration of a new camera which can be used via the network 204 and deletion of a camera disconnected from the network 204, but also serves that manages display inhibited zones registered in correspondence with the camera users. Furthermore, the camera management server 202 periodically transmits such management information of the camera control system to all camera control clients 213, or notifies each terminal device 201 of such information in accordance with a request.

The audio input management server 203 is a program that manages all microphones 219 equipped on each of the image communication terminal devices connected to the network 204, and also holds an information represented by the position and the using state of each microphone 219.

The audio input management server 203 not only manages registration of a new microphone 219 that can be used via the network 204 and deletion of a microphone disconnected from the network 204, but also periodically transmits management information of the microphones 219 to all audio input control clients 213 or notifies each terminal device 201 of such information in accordance with a request.

The camera control client 213 displays information such as the setting positions, directions, and the like of all the cameras 217 that can be used via the network 204 on the screen of a monitor 218 by displaying icons as indices that indicate the positions of the cameras 217 on the map. Also, the client 213 updates the display states of the icons of the cameras 217 in real time on the basis of camera information periodically sent from the camera management server 202, and stores necessary information in the received information in a secondary storage unit.

An audio input control client 216 displays the setting positions, directions, and the like of the microphones that can be used via the network 204 on the screen of the monitor 218 using microphone icons by superimposing them on the map.

Also, the audio input control client 216 updates the display states of the microphone icons in real time on the basis of information such as the directivities, positions, use states, and the like, periodically sent from the audio input management server 203.

Figure 3:
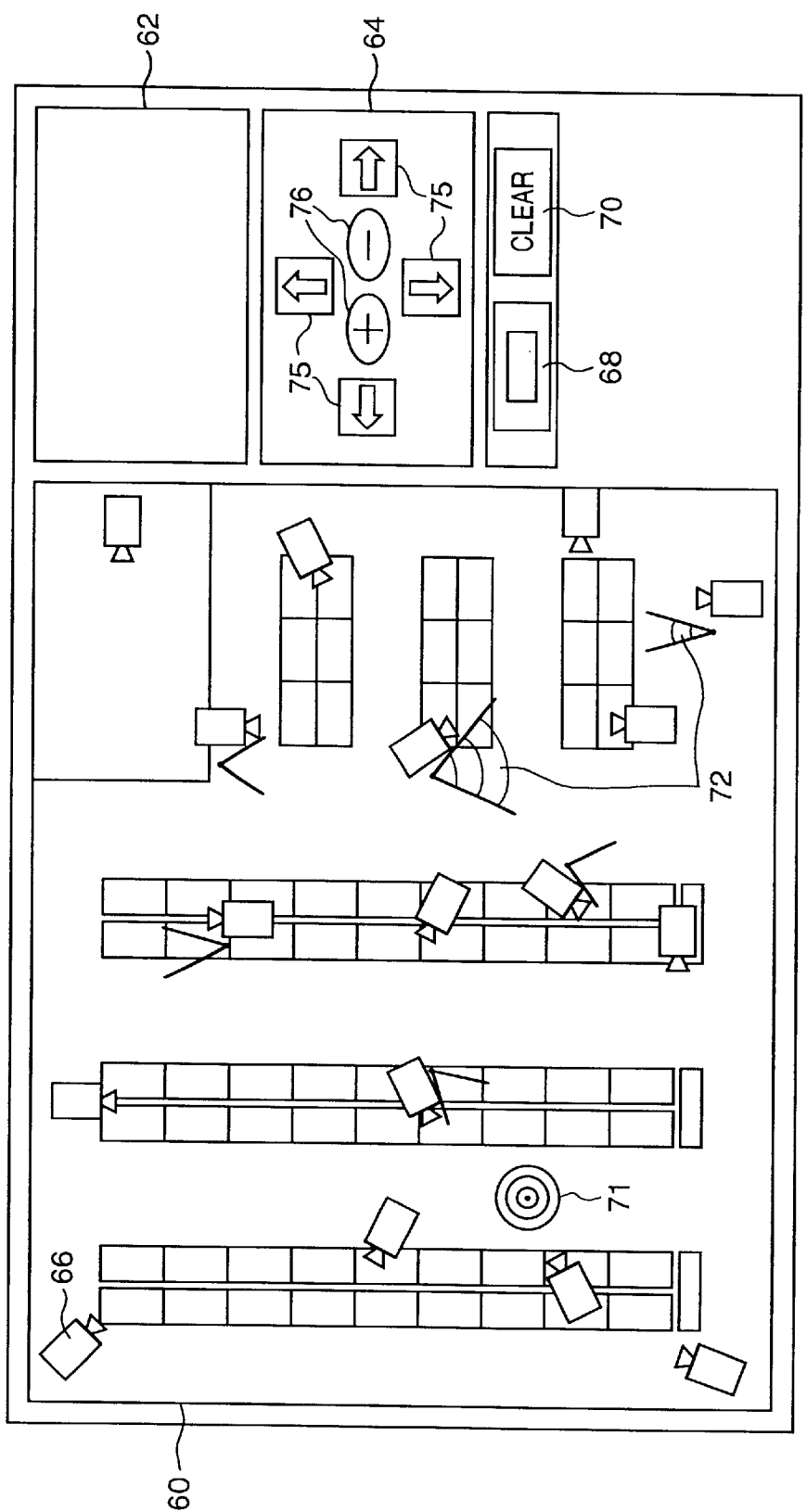
FIG. 3 shows an example of a camera control panel displayed on a monitor.

FIG. 3 shows an example of a camera display control panel displayed on the monitor 218 by the camera control client 213 and the audio input control client 216.

A map window 60 is displayed on the monitor and displays a map. It indicates the setting positions of the cameras and microphones that can be operated, and superimpose-displays camera icons indicating the setting positions and directions of the cameras and microphone icons indicating the setting positions and directivities of the microphones on the map.

A camera control panel 64 comprises operation buttons 75 for controlling the pan and tilt angles of the designated camera, and zoom operation buttons 76 for moving the lens of the designated camera toward the telephoto or wide-angle end to attain zoom control.

In this embodiment, the window display system that can simultaneously display a plurality of windows runs.

On the map window 60, a map indicating a seat layout or the like in an office or the like is displayed by reading it out from the secondary storage unit, and the CPU 116 displays, on the map, camera icons and microphone icons indicating the positions of the cameras and microphones to be set in that office on the basis of information received from the camera management server 202 and the audio input management server 203.

Camera icons 66 are displayed in different colors by the CPU 116 to identify a camera that has been selected for image display or remote control, a camera which is being used by another user, and a camera which is not used by anyone.

For example, a camera icon corresponding to the camera to be controlled by the user is displayed in green, a camera icon corresponding to a camera controlled by the user of another terminal is displayed in red, and a camera icon corresponding to a camera which is not controlled by anyone is displayed in blue.

As can be understood from the above description, the colors, directions, and the like of the camera icons are sequentially updated on the basis of information periodically sent from the camera management server 202 on the network.

When the designated camera cannot be operated (for example, when the camera to be accessed is already being operated by another user), the operation buttons 75 and zoom operation buttons 76 are set in an inaccessible display mode under the control of the CPU 116.

Note that the user can access (e.g., remote-control) a given camera by double-clicking a target camera icon.

In response to double-clicking, the camera control client 213 requests the camera management server 202 the right of operation to the camera, and checks with reference to a camera status list (to be described later) obtained from the camera management server 202 if the right of operation to the camera has already been granted to another user. If the right of operation to that camera has not been granted to any user, the right of remote operation (including image display) to that camera is granted; otherwise, access is denied.

If the right of operation is granted, the camera control client requests a device (server) having the camera corresponding to the selected camera icon the pickup image, and an output image of that camera is displayed on a camera image window 62 on the client side, thus allowing operates using the camera control panel 64.

At this time, the audio input control circuit 122 of the server as the pickup image transfer source controls the audio detection characteristics of the microphone 121 in correspondence with the field angle as the contents of a camera operation from the client side. The audio output control circuit 124 of the device on the client side controls the sound field of the loudspeaker unit 123 by the CPU 116 in accordance with the camera operation.

For example, when a certain client changes the direction of the camera 111 of a given server by panning or tilting, the sound field of the loudspeaker unit 123 on the client side is changed to match the contents of the audio detection characteristics of the microphone 121 controlled by the server.

On the other hand, when the field angle of the camera 111 is narrowed by zooming, the audio input control circuit 122 increases the sensitivity of the microphone 121 to change the depth of the sound field of the loudspeaker unit 123 in correspondence with the image pickup range of the camera.

When an object at the image of a far-distance position is picked up by zooming, the audio input control circuit 122 controls the audio detection characteristics of the microphone to detect only the sound from that object.

In this case, in particular, the directivity range of the microphone is narrowed and its sensitivity is increased. On the other hand, in accordance with the camera angle information and the audio detection characteristic information of the microphone from the management server, the client controls the sound field of the loudspeaker and also controls the direction of the corresponding camera icon and microphone icon on the map. Furthermore, as for the microphone icon, the client controls the angle two line segments make to indicate the directivity of the microphone in accordance with the directivity included in the audio detection characteristic information. With this control, microphone icons 72 can be displayed, as shown in FIG. 3.

As described above, the audio input control client 216 has a function of controlling the audio detection characteristics (divergence, direction, sensitivity) of the microphone and the sound field (divergence, direction, depth) of the loudspeaker to match with each other in correspondence with the pan and tilt directions, and the field angle of the camera, in synchronism with the camera control.

In the camera control system of this embodiment, an image pickup inhibited region where image pickup by the camera is inhibited can be set. Note that a supervisor can set the image pickup inhibited region.

Figure 4:
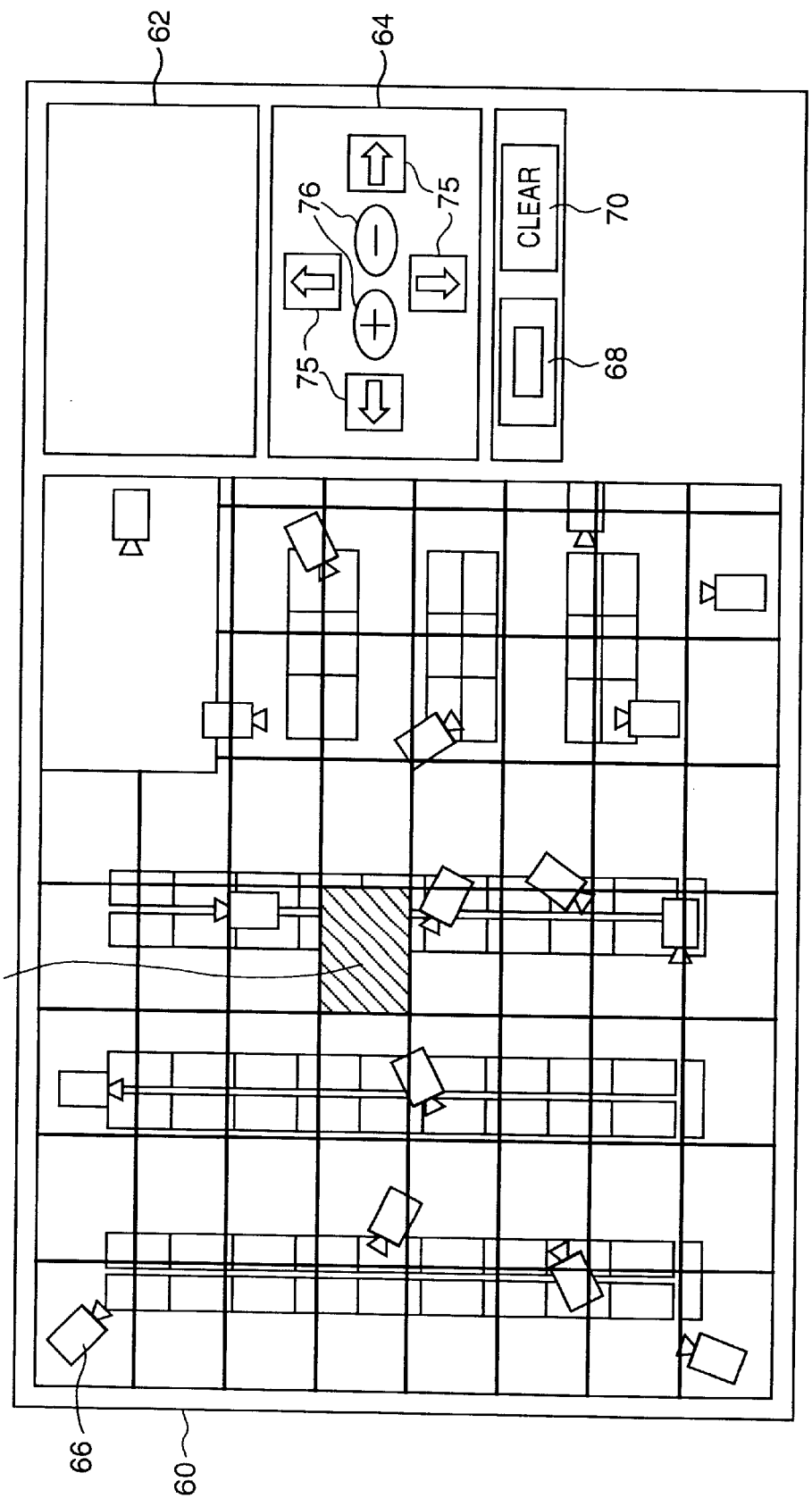
FIG. 4 shows an example of the camera control panel upon setting of an image pickup inhibited region to be displayed on the monitor.

When an image pickup inhibited region setting button 68 is clicked, the camera control client 213 draws vertical and horizontal lines on the map window 60, as shown in FIG. 4. Regions divided by these lines serve as basic units upon setting the image pickup inhibited.

An image pickup inhibited region 68 and a clear button 70 in FIG. 4 are displayed only when the supervisor users the device, but are not displayed when a normal user controls a camera. The supervisor or normal user can be discriminated by the user name and password input at the beginning of use of the device.

When the supervisor wants to set an image pickup inhibited region, he or she designates a divided region pickup of which is inhibited on the screen using the mouse 119. The designated divided region (a region 92 in FIG. 4) is displayed with a red frame to be easily distinguished from other divided regions.

Such image pickup inhibited regions can be set in correspondence with the levels of the individual users. That is, the image pickup inhibited regions are set in correspondence with users registered in the camera management server 202 by re-registering the set information.

The information of the image pickup inhibited region set by the supervisor is registered in the camera management server 202.

FIGS. 8A to 8C show management tables of the camera management server 202.

FIG. 8A shows a camera management table that manages the cameras corresponding to the camera icons shown in FIG. 3, and stores information of the camera number, the camera name, the computer name (host name) of the device, which has that camera, on the network, the setting position, initial direction (reference direction), current direction (pan angle), and current image pickup range (determined by the pan angle and zoom ratio) of the camera, and the image pickup inhibited region.

FIG. 8B shows a table for managing image pickup inhibited regions set by the supervisor, and stores the coordinates (the coordinates of the upper left and lower right corners) of rectangles set as the image pickup inhibited regions, and user level information for which image pickup inhibited regions are effective.

FIG. 8C shows a user management table that stores the individual user names and their levels.

In FIG. 8B, the image pickup inhibited region for level 1 is effective for users of levels 1 and 2. On the other hand, the image pickup inhibited region for level 2 is effective for users of level 2, but is an image pickup grant region for users of level 1.

When an image pickup inhibited region is to be cleared, the supervisor clicks the clear button 70.

Once an image pickup inhibited region is set, the camera control client 213 serves as a display inhibition means for inhibiting that image pickup inhibited region from being displayed on the image window 62 by the following control method.

Figure 5:
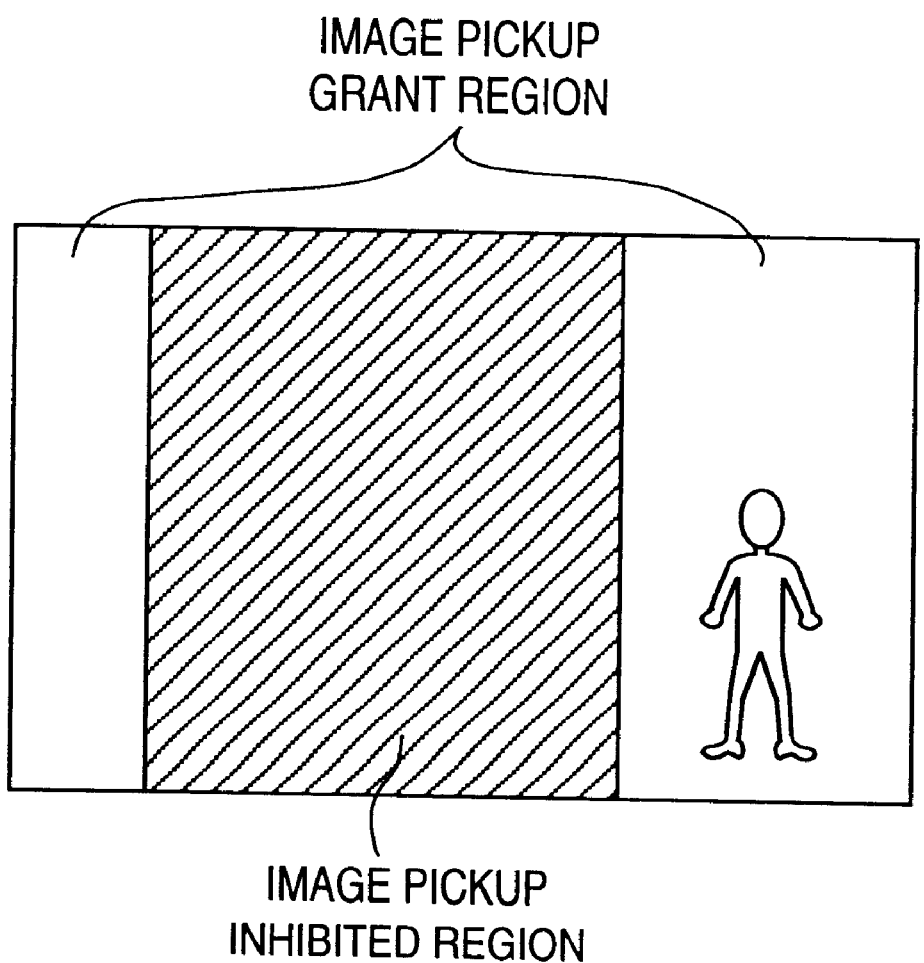
FIG. 5 shows a display example of an image window when image pickup is done while directing the camera to the image pickup inhibited region.

FIG. 5 shows a display example of the image window 62 when an image pickup inhibited region is set, and image pickup is done by directing the camera to that inhibited region.

When the normal user instructs to pan the camera to an image pickup inhibited region via the network, an image in the image pickup inhibited region is painted in black, and an image other than the image pickup inhibited region is normally displayed, as shown in FIG. 5.

Whether or not an image pickup inhibited region is set for a given user, and whether or not the current pan angle of the camera includes an image pickup inhibited region when the image pickup inhibited region is set for that user is determined by the CPU in accordance with information managed by the camera management server.

When the image display range changes by camera control, the black display portion of the image pickup inhibited region moves accordingly.

Figure 13:
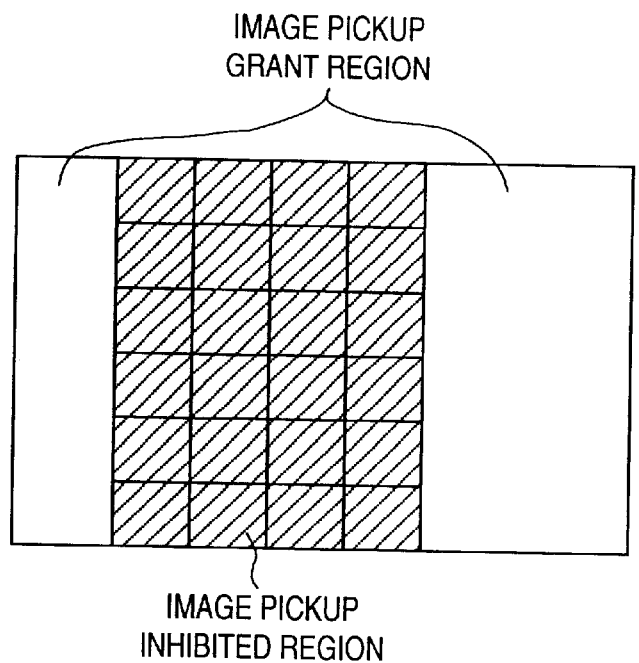
FIG. 13 shows another display example of the image window when image pickup is done while directing the camera to the image pickup inhibited region.
Figure 14:
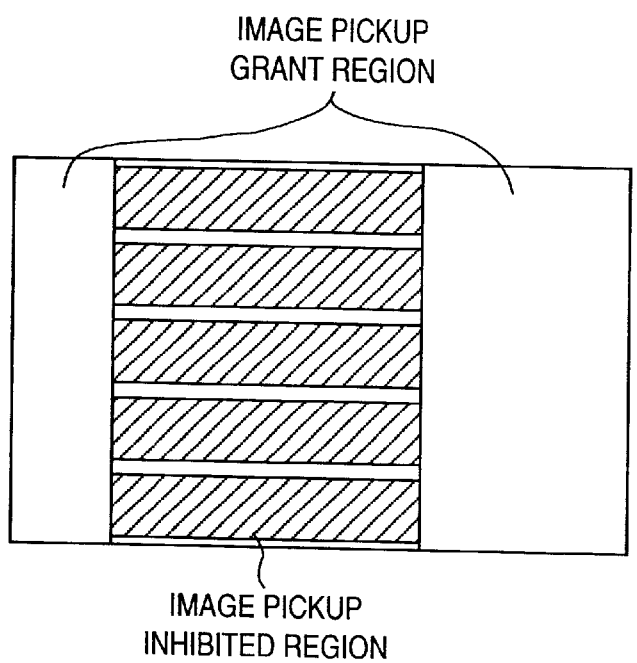
FIG. 14 shows still another display example of the image window when image pickup is done while directing the camera to the image pickup inhibited region.

As other display methods of the image pickup inhibited region, for example, the resolution in the image pickup inhibited region is considerably lowered as compared to a normal display region, or an image in the image pickup inhibited region is displayed in a mosaic pattern, as shown in FIG. 13, or only some portions of an image in the image pickup inhibited region may be displayed via a blind pattern, as shown in FIG. 14.

Figure 6:
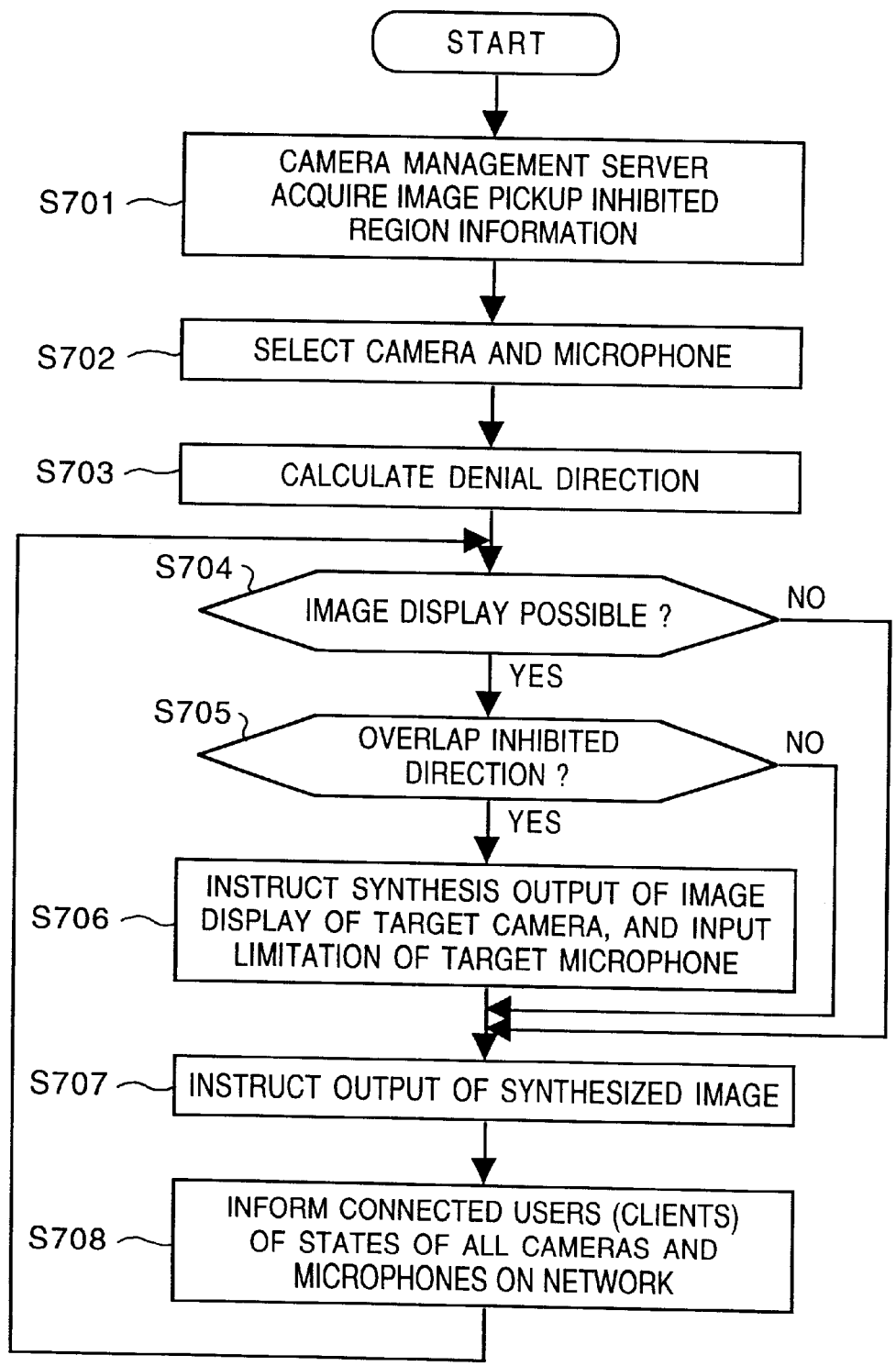
FIG. 6 is a flow chart associated with the display operation of the image pickup inhibited region.

FIG. 6 is a flow chart of the camera management server 202 and the audio input management server 203 associated with the display operation of the image pickup inhibited region. The flow of display including an image pickup inhibited region will be described below with reference to FIG. 6.

When an image pickup inhibited region is set or changed at the device operated by the supervisor, the camera management server 202 is informed of that information (S701).

The camera management server 202 calculates the coordinate information (the coordinate information of diagonal points of a rectangle) of the set image pickup inhibited region, and updates the image pickup inhibited region table with the calculated coordinate information.

When a normal user operates his or her own terminal and selects a desired camera icon, the audio input control client 216 selects a microphone in accordance with a camera corresponding to the selected camera icon (S702).

The method of selecting the microphone will be described in detail later. In this case, a microphone closest to the selected camera is selected.

The camera management server 202 calculates an image pickup inhibited direction with respect to camera i selected in step S702, and stores the calculated information in the corresponding column of the image pickup inhibited region in the camera management table (S703).

It is then checked if camera i is being remote-controlled by another user at a remote communication terminal, and its image is being displayed. If camera i is not used by any terminal, the user of interest can display an image input from camera i on his or her own terminal (S704).

When an image pickup inhibited region is set, the camera management server 202 always checks if the direction of the image pickup inhibited region overlaps the direction of the current image pickup range (the range displayed on the image window 62) of camera i (S705).

If the direction of the image pickup inhibited region overlaps the direction of the current image pickup range, the camera management server 202 instructs the image transmission/reception software program 212 of the image communication terminal device 202 (the device indicated by the host name in the camera management table), which has camera i, to synthesize a black region on the image sensed by camera i and displayed on the image window 62 in correspondence with the image pickup inhibited region, as shown in FIG. 5.

Furthermore, when the image pickup inhibited region is displayed, the audio input management server 203 instructs to inhibit an audio input upon reception of an image pickup inhibited region display command from the camera management server 202 (S706).

The image transmission/reception software program 212 receives the synthesized image signal transmitted via the network, and expands it to display an image on the display (S707).

The camera management server 202 and the audio input management server 203 transfer the contents of the camera management table (FIG. 8A) and the contents of the microphone status table (FIG. 15) managed by themselves to all the clients connected to the camera server on the network. Upon reception of such information, each client updates the display states (directions and the like) of the camera and microphone icons displayed on its display screen.

Especially, since video data and audio data transferred via the network include the host computer name, camera name, and microphone name as their transmission sources, the client displays the selected camera and microphone icons in a color that can be distinguished from other icons in accordance with the received information.

The direction of the image pickup inhibited region of camera i in step S703 is calculated as follows.

Figure 7:
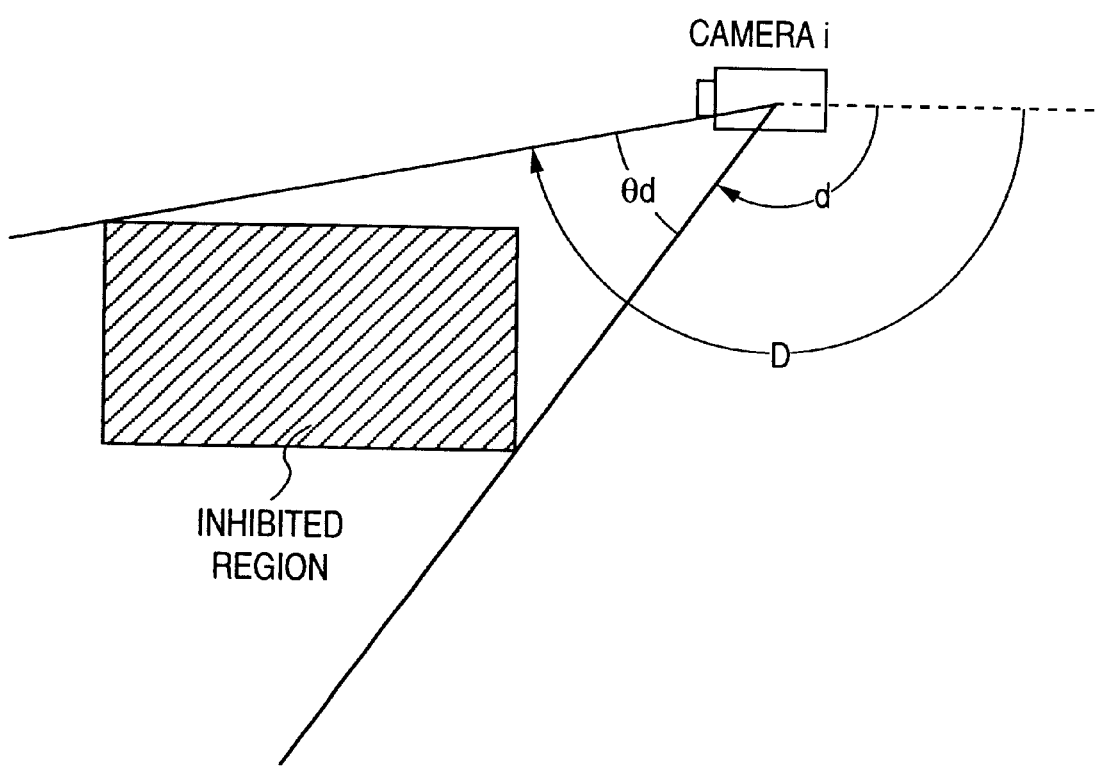
FIG. 7 shows the positional relationship between the camera i and its image pickup inhibited region.

FIG. 7 is a top view of the positional relationship between camera i and its image pickup inhibited region. Based on the setting position of camera i and the coordinates of the inhibited region, an angle θd (d<θd<D) of the image pickup inhibited range of camera i is calculated. Note that d and D are expressed by angles with reference to a given horizontal direction. The camera management table of the camera management server 202 stores these angles d and D in the column of the image pickup inhibited region.

The audio input control client 216 serves as an audio output inhibition means that inhibits an audio output from the loudspeaker 220 when the synthesized output of the image pickup inhibited region is being displayed.

On the other hand, the audio input control client may control the directivity of the microphone 121 so as not to receive sounds in the image pickup inhibited region, thereby preventing audio outputs in the image pickup inhibited region from the loudspeaker 220.

The camera management server 202 always checks the user's instruction contents and the camera management table to monitor the overlapping state between the selected camera and the image pickup inhibited direction.

The camera management server 202 periodically sends the contents of the camera management table to the camera control clients 213. The camera control client of 213 of each terminal device updates the directions of the camera icons, the directions and spreads of the microphone icons on the map window 60 displayed on the display 218, and the like on the basis of the information from the camera management server 202.

FIG. 15 shows an example of the microphone status table which is stored in the audio input management server 203 and stores the position information and current states of the individual microphones. More specifically, the microphone status table stores information such as the microphone number, the microphone name, the host name (user name), the microphone setting position coordinates on the map, the initial direction of the center of the microphone upon starting the system, the direction of the current audio input-table range, and the like.

Whether or not the sound detected by the microphone is transferred to a client is determined on the basis of the level of a user who is operating the camera, and the presence/absence of an image pickup inhibited region within the photographing range corresponding to the level. For this reason, the microphone status table stores only the above-mentioned information.

The audio input management server 203 always checks the microphone status table shown in FIG. 15 to monitor the overlapping state between the audio input grant direction and the input direction of the selected microphone.

The audio input management server 203 periodically sends the contents of the microphone status table to the audio input control clients 216, and each audio input control client 216 updates and displays the directions of the microphone icons on the map window 60 displayed on the display 218 on the basis of the information from the audio input management server 203.

A method of calculating the display position to display the image pickup inhibited region in black will be explained below.

A portion of the image pickup inhibited region to be displayed on the image window, i.e., a portion to be painted in black, as shown in FIG. 5, is calculated on the basis of the image pickup inhibited direction of the camera calculated based on the image pickup inhibited region, and the current image pickup direction of the camera, and the image transmission/reception software program 212 performs image processing for synthesis.

Figure 11:
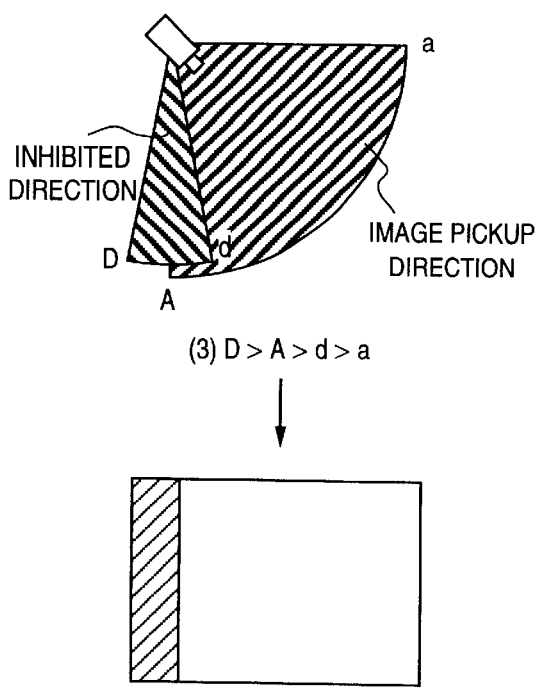

There are three display patterns (1) A>D >a>d, (2) A>D>d>a, and (3) D>A>d>a of the synthesized image depending on the overlapping state between an image pickup grant range θa (a<θa<A: expressed by angles with reference to the same horizontal direction as that for d and D), and the image pickup inhibited range θd (d<θd<D). FIGS. 9, 10, and 11 respectively show the display states on the image window in patterns (1), (2), and (3).

In order to synthesize and display a black portion in an image display region, a portion to be displayed in black in the rectangular region of the image window must be calculated.

Figure 12:
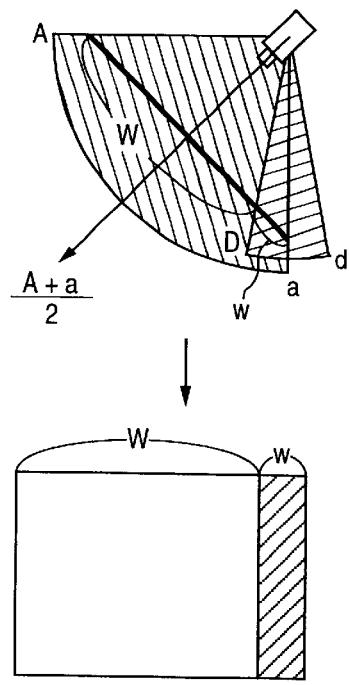

FIG. 12 shows the image pickup inhibited direction when (1) A>D>a>d. In FIG. 12, W is the width of a region in which an image can be displayed, and w is the width of a region in which image display is inhibited and which is displayed in black.

In FIG. 12, the ratio of W to w is expressed by:

$$W:w=[\tan\{(A-a)/2\}+\tan\{(A+a)/2-D\}]:[\tan\{(A-a)/2\}-\tan\{(A+a)/2-D\}]$$

Similarly, the ratio of W to w can be obtained by simple calculations in the cases of (2) A>D>d>a and (3) D>A>d>a.

As described above, since the audio detection characteristics (divergence, direction, sensitivity) of the microphone are controlled to match the pan and tilt directions and field angle of the camera, and the audio input is controlled so as not to pick up sounds in the image pickup inhibited region, a system with high reality can be realized, and a camera control system which can avoid unwanted audio outputs can be provided.

In particular, since the camera and microphone are mounted on a single panhead, the direction of the microphone can be changed by changing, e.g., the pan angle of the camera, thus allowing easy management of the microphone.

In the above description, the camera control and audio input control are interlocked. Alternatively, audio inputs may be controlled independently of the camera control.

For example, when the user designates a desired microphone by clicking the corresponding microphone icon on the map window 60 shown in FIG. 3, the audio input control client 216 requests the right of operation to that microphone to the audio input management server 203, and the audio input management server 203 looks up, e.g., a microphone status list and the like in response to the request.

When the right of operation to the designated microphone is not granted to another user, the right of remote control of the microphone is granted. When the right of operation is granted to another user, remote control of that microphone is inhibited.

When remote control is granted, the audio input control client 216 displays a microphone icon 71 on the map window 60 to inform the user of reception of local sound independently of the camera.

As described above, when the audio control is done independently of the camera control, only local sound in the map (e.g., an utterance of a specific person) can be received.

When the user accesses (remote-controls) a plurality of cameras, he or she must select one microphone. However, the audio position is hard to identify. In view of this problem, the current audio reception state is displayed on the map window 60 in FIG. 3.

The audio input control client 216 displays icons 71 and 72 that allow the user to visually confirm the audio regions of the microphones when it shows the currently receiving audio position of the own terminal.

Furthermore, the audio input control client 216 causes a microphone index corresponding to the currently output speech source to flicker or displays it in a pattern different from other microphone indices on the basis of the audio management information obtained from the audio input management server 202, so that the correspondence between the currently output sound and the position of the microphone can be visually confirmed.

In this manner, since the sound source state (directivity, sensitivity, and the like) of the currently receiving sound is displayed on the map, the input position of the sound can be visually confirmed.

The processing sequence on the client side will be explained below with reference to the flow chart in FIG. 28.

In step S1301, it is checked if the received data is sent from the camera server. If YES in step S1301, the flow advances to step S1302, and the host name, camera name, and microphone name included in the received data are extracted. Also, image data and audio data are expanded. Camera and microphone icons indicated by the camera name and microphone name are displayed in predetermined colors to be distinguished from other camera and microphone icons. The image data is displayed on the window 62 in FIG. 3, and the audio data (if any) is output to the loudspeaker connected to the client device.

If it is determined in step S1301 that the received data is not sent from the camera server, the flow advances to step S1303 to check if the received data is sent from the camera management server. If YES in step S1303, the processing in step S1304 is executed. Since the data from the camera management server includes information shown in the table of FIG. 8A described above, the directions of all the camera icons on the map window 60 in FIG. 3 are updated on the basis of the received data.

If it is determined in step S1303 that the received data is not sent from the camera management server, the flow advances to step S1305 to check if the received data is sent from the audio input management server. If NO in step S1305, the received data is ignored (used in other tasks).

On the other hand, if YES in step S1305, the display states of all the microphone icons on the map window 60 are updated in accordance with the received data (the contents of the table shown in FIG. 15). More specifically, the center of two straight lines of each microphone icon is adjusted to the pointing direction of the microphone, and the lengths of the two straight lines and the angle they make are adjusted to express the audio input range.

With the above processing, image and audio data are transferred from the camera server, a live image is displayed on the window 62 in FIG. 3, and audio data can be heard if any. Furthermore, since other camera and microphone icons in the map are updated in real time, the operation contents of other clients can be detected.

Note that the present embodiment can also be achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present embodiment is applied to the storage medium, the storage medium stores program codes corresponding to the above-mentioned flow chart. Briefly speaking, modules indispensable for the camera control system of the present invention are stored in the storage medium.

In the present embodiment, at least program codes of a "map selection module" for selecting a map that can be displayed for each user, and a "camera setting module" for setting the region of a camera that can be displayed for each user are stored in the storage medium.

In the first embodiment, one and only camera management server is arranged on the network. Alternatively, the camera management server may be realized by installing a program that implements the function of the camera management server in a device that transmits camera images or a client device.

As described above, according to the first embodiment of the present invention, since audio inputs are inhibited within the image display denial range, a camera control system with high security can be provided.

Since the directivity of sound inputs is controlled in correspondence with the camera, a very real camera control system can be provided.

Since an index indicating the position and direction of a cameras or an index indicating the position and directivity of a microphone is displayed on the map, a camera control system with which the user can easily recognize the current output positions of the image and sound can be provided.

Since the image display denial region can be set on the map, a camera control system which can very easily set a display denial region can be provided.

Since image display denial regions can be set in units of users, a camera control system with high security and flexibility can be provided.

Since the already set image display denial region can be changed, a camera control system with very high flexibility can be provided.

Since the index of a microphone corresponding to sound which is being output is displayed to be different from other microphone index means, the user can easily recognize the position of the microphone from which the sound was input.

<Second Embodiment>

In the first embodiment described above, the camera management device is set on the network. The first embodiment is suitable for a case wherein cameras are set in units of relatively limited spaces such as floors, and are connected via a high-speed network.

When a device that provides a transfer service of images sensed by cameras onto a worldwide network such as the Internet is set, that device preferably performs self management.

In the second embodiment, a device that provides an image transfer service manages and controls the user levels by itself.

The second embodiment according to the present invention will be described below with reference to the accompanying drawings.

The outline of the second embodiment according to the second embodiment will be described below. In the second embodiment, when an image from a camera connected to a camera control server is displayed on a camera client via a network, the camera controllable range is dynamically changed in accordance with the member who has access to the camera image.

Figure 16:
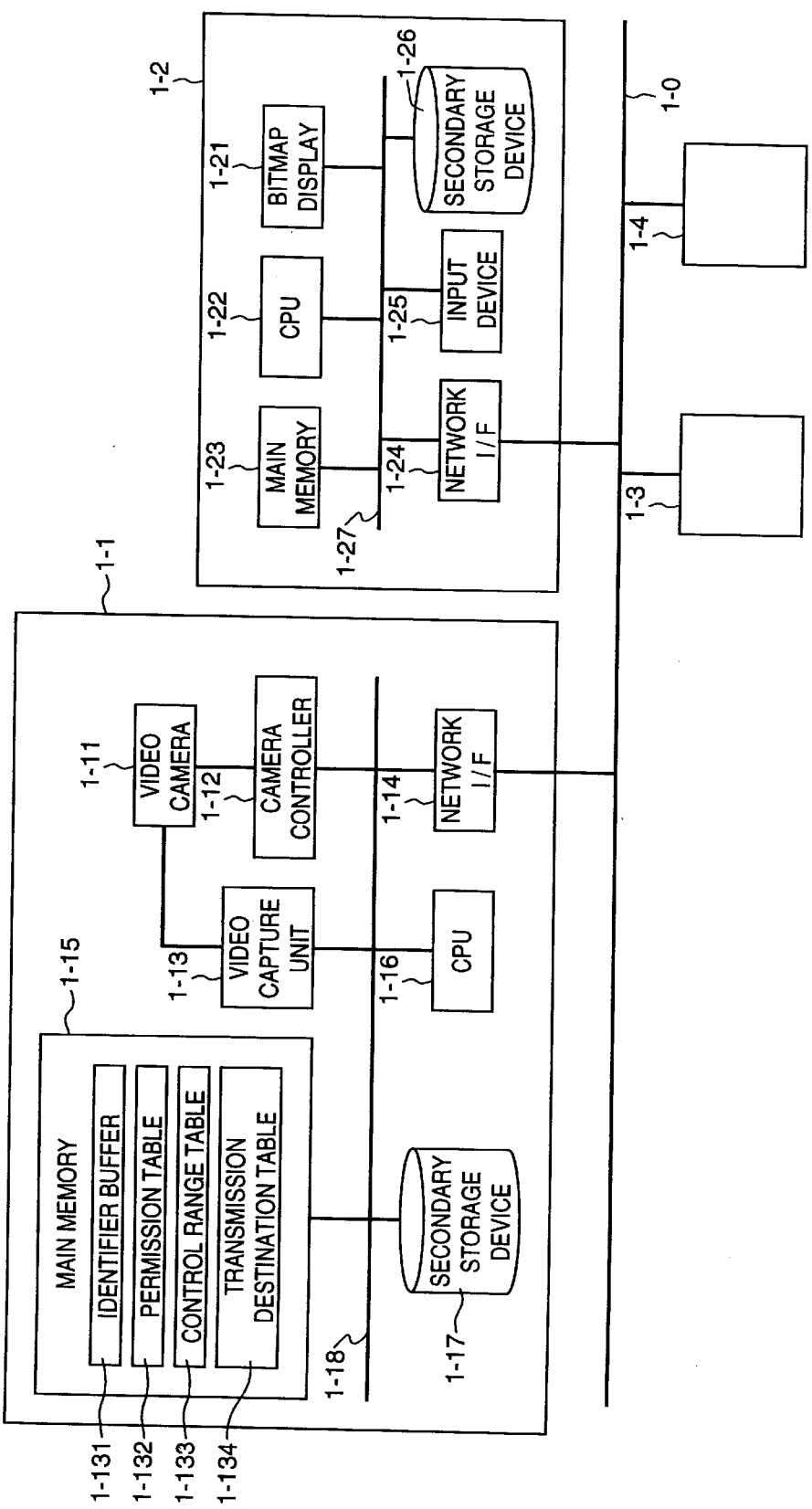
FIG. 16 is a block diagram of the second embodiment.

FIG. 16 is a block diagram of a system of the second embodiment. In FIG. 16, reference numeral 1-1 denotes a camera server device; and 1-2, 1-3, 1-4, . . . , camera client devices. In the following description, the camera server device will be simply referred to as a camera server, and the camera client device will be simply referred to as a camera client.

The camera server 1-1 captures an image from a video camera and distributes it to the camera clients. Also, the camera server 1-1 has a function of receiving a camera control command from each camera client, and controlling the image sensing state (pan, tilt, zoom, and the like) of the camera. The number of camera clients is not particularly limited, but in this embodiment, three camera clients are arranged, as shown in FIG. 16. The camera clients 1-2, 1-3, and 1-4 request the camera server 1-1 image distribution and observe images, and also transfer a camera control request to the camera server 1-1. In response to this request, the camera server 1-1 grants the right of operation to one camera client, and transfers the sensed image to other camera clients. That is, the right of camera operation is exclusively controlled.

The camera server 1-1 has the following arrangement.

Reference numeral 1-11 denotes a video camera having a solid-state image sensing element. The video camera 1-11 can freely change its image sensing magnification (zoom ratio), and has a predetermined panhead. Reference numeral 1-12 denotes a camera controller which supplies driving control signals for the zoom ratio of the video camera 1-11, and pivotal movements in the horizontal and vertical directions (pan and tilt) of the panhead. Reference numeral 1-13 denotes a video capture unit for capturing an image sensed by the video camera 1-11. The video capture unit 1-13 captures an NTSC video signal from the video camera 1-11, performs A/D conversion and Motion JPEG compression of the video signal, and outputs the compressed video signal. In this embodiment, Motion JPEG is used as the video compression scheme, but this embodiment is not particularly limited to such specific compression scheme.

Reference numeral 1-14 denotes a network interface for connecting the camera server 1-1 to a network 1-0. Reference numeral 1-16 denotes a CPU for controlling the overall camera server 1-1. The CPU 1-16 performs control operations in accordance with an OS and camera control program loaded onto a main memory 1-15 from a secondary storage device 1-17. The main memory 1-15 is used as the storage area for the above-mentioned program and a work area of the CPU 1-16. Also, the main memory 1-15 has an identifier buffer 1-131, a permission table 1-132, a control range table 1-133, and a transmission destination table 1-134, as shown in FIG. 16. Portions corresponding to these areas are stored as files on the secondary storage device 1-17, and are loaded onto the main memory 1-15 upon starting the system. When a RAM 1-15 is powered all the time by a backup battery, the contents of such areas need not always be stored as files in the secondary storage device 1-17.

In the above-mentioned arrangement, the CPU 1-16 transfers compressed video data output from the video capture unit 1-13 to devices connected as camera clients via the network interface 1-14. On the other hand, upon reception of a camera control instruction request from the camera client given the right of operation, the CPU 1-16 instructs the camera controller 1-12 to control zoom, pan, and tilt in accordance with the received contents.

Note that the transmission frame rate of video data from the camera server 1-1 to the camera clients varies depending on the patterns (e.g., Ethernet, a network via a telephone line, and the like) of the network 1-0, and the traffic of the network.

The camera client will be described below. Since the arrangements and operations of the camera clients 1-3 and 1-4 are substantially the same as those of the camera client 1-2, the camera client 1-2 alone will be described below.

Figure 17:
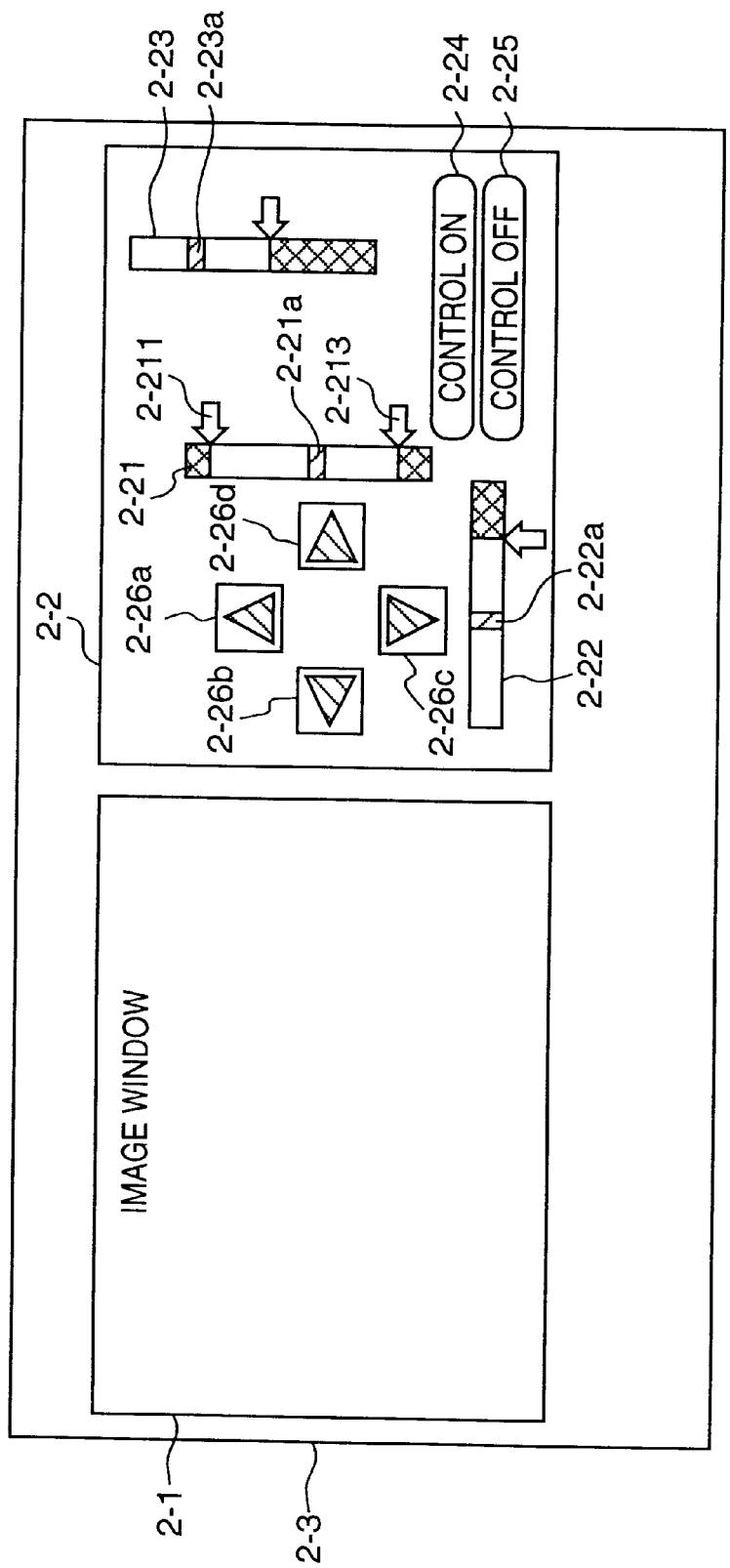
FIG. 17 shows an example of a screen of the second embodiment.

The compressed video data distributed from the camera server 1-1 is received via a network interface 1-24, is expanded by a CPU 1-22, and is displayed on a bitmap display 1-21. Note that the bitmap display 1-21 displays a user interface screen, as shown in FIG. 17. On this screen, an image is displayed on an image window 2-1. Note that a window system (e.g., MS-Windows available from Microsoft Corp.) is running on the camera client 1-2, and an application program that can display the screen shown in FIG. 17 is also running (FIG. 17 will be described in detail later).

Hence, a secondary storage device 1-26 of the camera client 1-2 stores application programs that run as a camera client as well as the window system (OS). Note that reference numeral 1-22 denotes a CPU for controlling the overall camera client 1-2; 1-23, a main memory on which the CPU 1-22 maps the OS and camera client application programs to be processed; 1-21, a bitmap display; and 1-25, an input device such as a keyboard, a pointing device, or the like.

Figure 18:
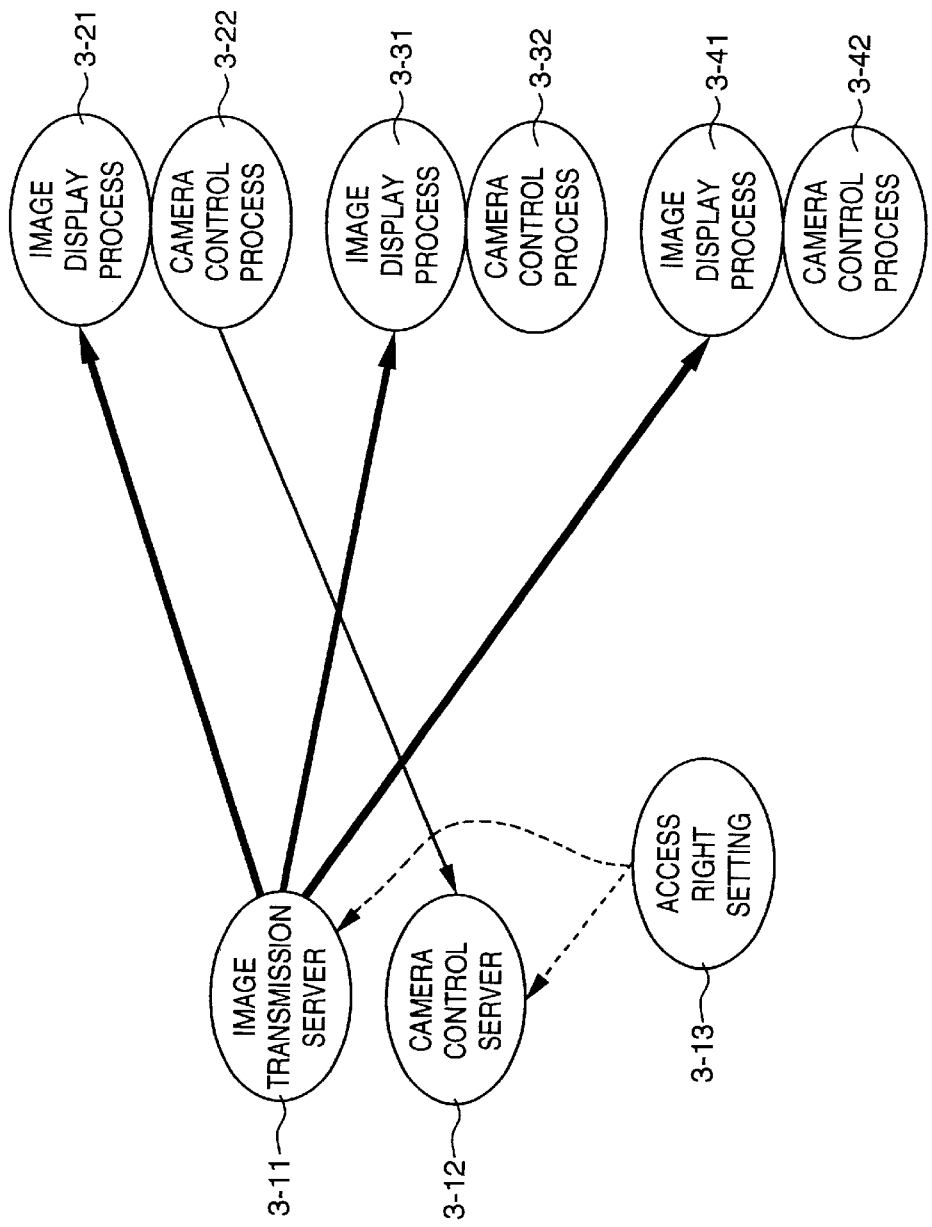
FIG. 18 is a process diagram of the second embodiment.

FIG. 18 is a process diagram of the second embodiment. Note that the process means that of a multitask operating system such as UNIX or the like. An image display process 3-21 and a camera control process 3-22 are operating on the camera client 2-1. These processes are implemented by executing a program by the CPU 1-22. An image transmission server process 3-11, and a camera control server process 3-12 are operating on the camera server 1-1. These processes are also implemented by the CPU 1-16 of the camera server 1-1.

The image transmission server process 3-11 controls video capture, compression, and distribution. The image display process 3-21 controls fetching of the compressed image distributed by the image transmission server process 3-11 from the network, expansion, and image display on the bitmap display 1-21.

The camera control server process 3-21 receives a camera control command issued by the camera control process 3-22 running on the camera client, and implements camera control by actually controlling the camera controller 1-12. The camera control process 3-22 displays a camera control window 2-2 shown in FIG. 17 on the display 1-21 to provide a user interface for various camera operations by the user. For example, when the user locates a cursor displayed in correspondence with the movement of a pointing device at the position of a button 2-26a or 2-26c shown in FIG. 17 and presses down a button of the pointing device (this operation will be referred to as "clicking" hereinafter), he or she instructs the camera server 1-1 to control the tilt angle of the camera. Buttons 2-26b and 2-26d are used for controlling the pan angle.

Note that pan and tilt angles are also controlled by operating knobs 2-21a and 2-22a of scroll bars 2-21 and 2-22. For example, when the user moves the cursor to the position of one of these knobs, and thereafter, moves the knobs vertically or horizontally while pressing down the button of the pointing device, the tilt or pan angle can be controlled (in general, the operation for moving the cursor while pressing down the button is known as "dragging"). In other words, the positions of the knobs 2-21a and 2-22a indicate the current angle position in a potential image pickup range when the angle of the video camera of the camera server 1-1 has changed.

A scroll bar 2-23 is used for controlling the zoom ratio. As in the scroll bars 2-21, 2-22, and the like, the zoom ratio can be controlled by dragging a knob 2-23a, and the current zoom ratio can be checked. Note that the zoom ratio lowers (the field angle increases) as the knob 2-23a is located at an upper position, and it rises (the field angle decreases) as the knob 2-23a is located at a lower position.

Reference numeral 2-24 denotes a button for requesting the right of operation; and 2-25, a button for releasing the right of operation. These buttons can be operated by clicking them.

The pan angle, tilt angle, and zoom ratio can be controlled as described above, but these operations are allowed only when the client is granted the right of operation from the camera server 1-1. When the right of operation is not granted, the buttons 2-26a to 2-26d and the scroll bars are displayed but cannot be operated. When another camera client has the right of operation, information associated with the camera control (pan angle, tilt angle, zoom value (indicating the zoom ratio) is transferred together with video data, and the knob positions of the scroll bars move according to the received information.

The right of camera operation is set on the camera server 1-1, as described above. For this purpose, the camera control server process 3-12 (a program executed by the CPU 1-16 of the camera server) in the camera server 1-1 makes exclusive control so that the user who has gained the right of operation can access the camera.

Figure 19:
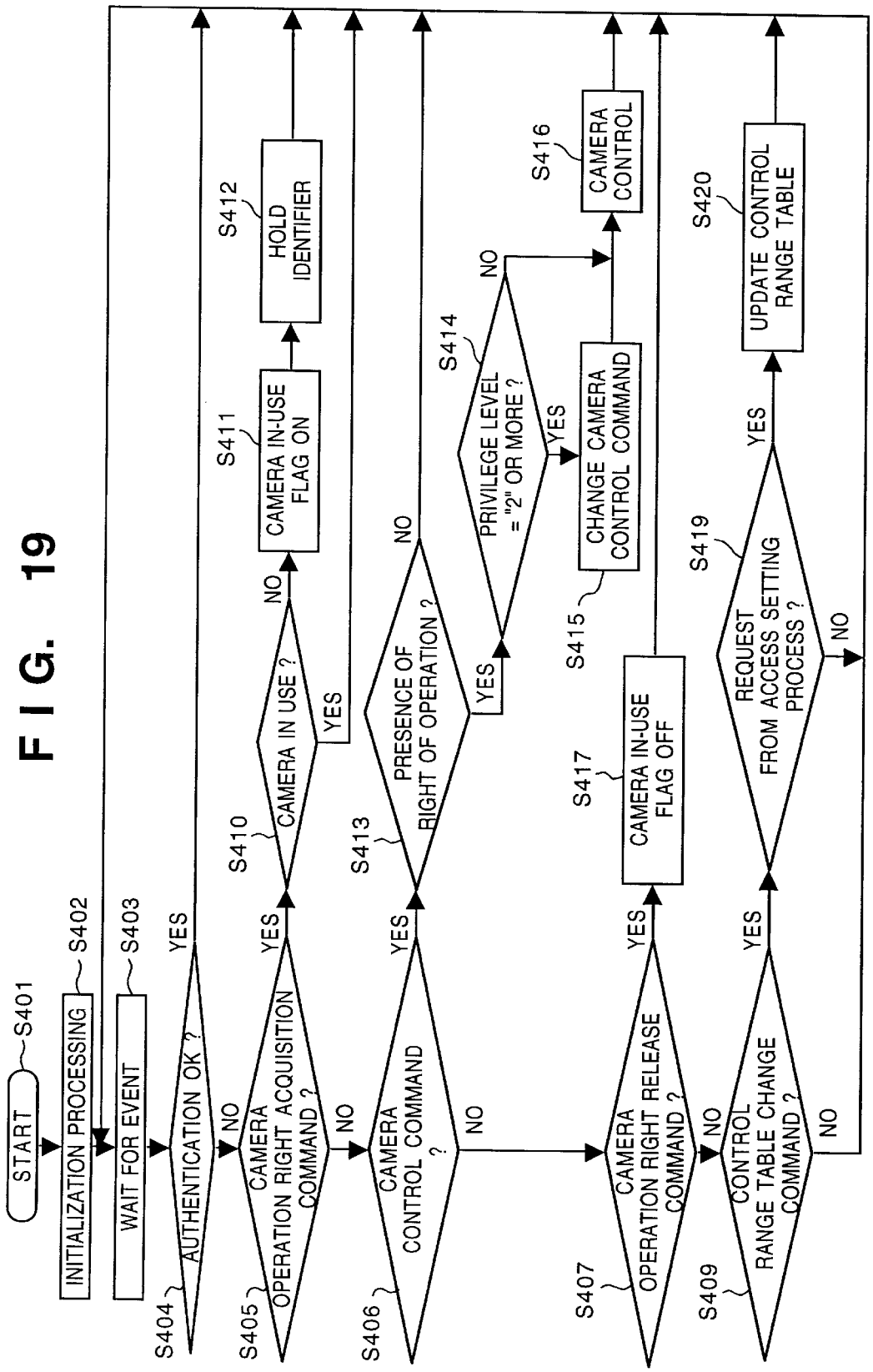
FIG. 19 is a flow chart of a camera control server of the second embodiment.

The contents of the camera control server process 3-12 in the camera server 1-1 will be described below with reference to the flow chart in FIG. 19.

In step S402, initialization processing is performed. The initialization processing includes processing for setting, e.g., the pan angle, tilt angle, and zoom value at predetermined values to direct the camera in a predetermined direction and to initialize the zoom ratio.

In step S403, the control waits for an event. The event includes the presence/absence of a request from a camera client and the like. The request includes acquisition of the right of operation, release of the right of operation, and change of the camera angle (pan angle, tilt angle, and zoom value).

Upon detection of an event, the flow advances to step S404 to execute authentication processing to check if the user who requested access is an authorized user. This checking is done by looking up the permission table 1-132 in the main memory 1-15. The permission table 1-132 has an architecture shown in, e.g., FIG. 21. The left column in FIG. 21 stores the user names on the network, and the right column stores their privilege levels. The privilege level is higher as its numerical value is smaller, and is lower as it is larger.

In step S404, it is checked if the user name appended to the received request command is registered in the permission table 1-132. If it is determined that the user is registered, and if the request is a connection request, since the sensed image is to be transferred to that client, the user name is registered in the transmission destination table 1-134 as a connected user. FIG. 22 shows the contents of the transmission destination table 1-134. The table shown in FIG. 22 indicates that three users (three camera clients) are connected to this camera server 1-1. Also, the table indicates that user "Suzuki" has the right of operation.

If authentication is successful in step S404, processing corresponding to the request content is executed.

If it is determined that the received request is an acquisition request for the right of camera operation, the flow advances from step S405 to step S410 to check if a camera in-use flag assured in advance in the main memory 1-15 is ON. This flag indicates the presence/absence of a client who has acquired the right of camera operation at that time. If the flag is ON, such client is present; otherwise, such client is absent.

If it is determined in step S410 that a user with an ON camera in-use flag is present, since at least another client has already acquired the right of operation and is accessing the camera, and the acquisition request of the right of operation cannot be met, the flow returns to step S403. If all the flags are OFF, the flow advances to step S411 to turn on the camera in-use flag of that use, and store the user name of the acquisition request source for the right of operation in the identifier buffer 1-131 in the main memory 1-15.

If the request contents correspond to a change instruction command of the pan angle, tilt angle, and zoom value (these will be generally referred to as an angle hereinafter), the flow advances from step S406 to step S413 to check if that client is a user who has already given the right of operation. Since the user name who has already given the right of operation is stored in the identifier buffer 1-131, checking in step S413 can be attained by verifying the user names. If the request has been sent from a client who is not given the right of operation, since he or she cannot make camera control, the flow returns to step S403.

If it is determined that the client has already given the right of operation, the flow advances to step S414 to check the privilege level of that client by looking up the permission table 1-132 (the privilege level of the client who has the right of operation at that time can be detected by looking up the permission table 1-132).

If it is determined that the client has privilege level "1", it is determined that the angle is not limited, and the flow advances to step 416 to control the camera in accordance with the instructed angle (pan angle, tilt angle, and zoom value).

On the other hand, if the client has privilege level "2" or more, it is determined that the angle is limited within the potential view field range (field of view when the camera is panned and tilted at the wide-angle end) of the camera, and the flow advances to step S415. In step S415, if the requested angle exceeds the allowable range, processing for changing the angle to fall within the allowable range is performed.

Information representing the relationship between the privilege level ("2" or more) and the allowable angle information is stored in the control range table 133 in the main memory 1-15.

In this embodiment, the privilege level ranges from 1 to 3, and the user with privilege level "1" is allowed to make full accesses. For this reason, the table 1-133 stores control range information for two privilege levels "2" and "3".

Figure 23:
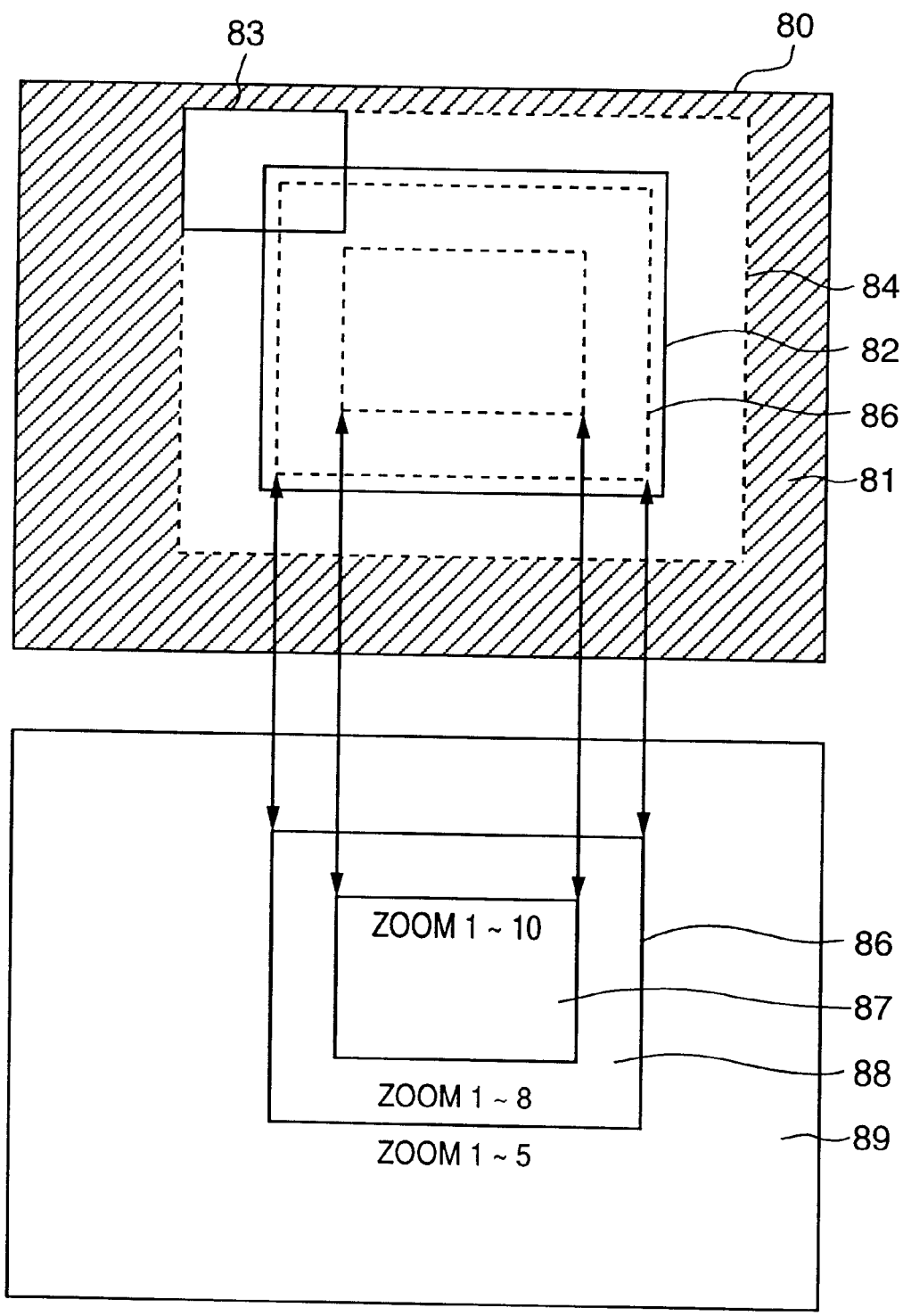
FIG. 23 shows the limitation contents of privilege level "2" in the second embodiment.

The limitation contents will be described in detail below with reference to FIG. 23. FIG. 23 schematically shows information representing the limitation range for, e.g., privilege level "2". In FIG. 23, reference numeral 80 denotes a view field range (potential view field range) that allows image pickup when the pan and tilt angles are changed while setting the zoom value of the video camera of the camera server 1-1 at "1". Note that the video camera 1-11 of this embodiment can control the zoom value in 10 steps from 1 (maximum field angle=lowest zoom ratio) to 10 (minimum field angle=largest zoom ratio).

Referring back to FIG. 23, reference numeral 82 denotes a maximum range that the center of field of view of the camera can take at privilege level "2"; and 83, a view field range that actually allows image pickup when the camera is directed toward the upper left corner when the zoom value is "1". Hence, reference numeral 84 denotes a potential view field range that can be observed at privilege level "2". In other words, even when the client with privilege level "2" acquires the right of operation, he or she cannot set a region 81 in FIG. 23 to fall within the view field range.

In practice, the control range table 1-133 stores the coordinate positions of the boundary 84 in FIG. 23. The size of the view field range 83 that allows actual image pickup becomes smaller as the zoom value becomes larger. In other words, the size of the frame 82 in FIG. 23 varies in accordance with the zoom value.

Note that the size of the frame 84 in FIG. 23 for a client with privilege level "3" is smaller than that for level "2".

When a person wants to observe an "object" well, he or she is likely to observe it in an enlarged scale. In the case of FIG. 23, the user cannot positively direct the camera toward a region 81, but can observe a portion near the boundary of the region 81 in an enlarged scale. It is often hard to divide the region to be hidden from the user using vertical lines and horizontal lines. If an excessively small frame 84 is set to assure high security, the users may be dissatisfied. In this embodiment, the allowable range of the zoom value is set in correspondence with the view point position (angle).

According to the above description, a portion that can be positively observed is near the center of the region 82, and the zoom value of the camera can be freely changed near this portion within its variable range. However, since the end of the view field range approaches the region to be hidden from the user, it is preferable to inhibit a large zoom value from being set at that position.

For this purpose, as shown in FIG. 23, frames that define the variable ranges of the zoom value are determined in correspondence with the central position of the video camera, thus setting the allowable ranges of the zoom value like in regions 87, 88, and 89 defined by these frames.

The maximum zoom ratio that can be set gradually becomes smaller toward the end of the view field range that can be sensed, and can be controlled so that an extremely large enlarged scale cannot be set. The camera control command change processing in step S415 above changes the zoom value.

As described above, since the users are managed in units of their privilege levels, in other words, hierarchically, different allowable ranges associated with the camera control can be hierarchically set.

As can be understood from the above description, the black portions in the scroll bars 2-21, 2-22, and 2-23 shown in FIG. 17 indicate that the corresponding knobs cannot move into these black portions.

A description will continue referring back to FIG. 19.

If the request from the client is a release request for the right of operation from the client who has the right of camera operation, the flow advances from step S407 to step S417 to turn off the camera in-use flag, and thereafter, the flow advances to step S403. The contents of the identifier buffer 1-131 may be cleared, but the clear processing is omitted since the identifier buffer becomes insignificant when the user in-use flag is OFF.

If a change command of the control range table 1-133 is received, the flow advances to step S419. If it is determined in step S419 that the request comes from an access right setting process 3-13, the flow advances to step S420 to update the contents of the control range table 1-133 (step S420).

The contents of the control range table 1-133 are changed in accordance with an instruction from a console (not shown) of the camera server 1-1, but may also be changed in response to a request from a user with privilege level "1". In the latter case, such request from a user with privilege level "1" is preferably accepted even if he or she does not have any right of camera operation. This is because this request is not directly associated with image transmission.

The operation of the image transmission server process 3-11 will be described below with reference to the flow chart in FIG. 20.

In steps S504 to S507, images are captured and distributed at predetermined periods. In this case, images are transmitted to the camera clients who are connected at that time and registered in the transmission destination table 1-134.

Whether or not an image input from the video camera 1-11 can be directly transferred to all the connected clients after it is compressed is in question. That is, as described above, the client who acquired the right of operation can change the camera angle within the allowable range corresponding to the privilege level of that client. For example, when the user with privilege level "1" gains the right of camera operation, he or she can observe an image in a desired direction and at a desired zoom value within the movable range of the video camera 1-11 since he or she has no limitations. In this case, images to be hidden from the clients with privilege level "2" or more are transferred unwantedly.

In order to solve this problem, in this embodiment, an image portion in the region to be hidden in correspondence with the privilege levels of sensed image data is masked (corresponding to the synthesis processing in the first embodiment). However, in this case, mask processing need not be prepared in correspondence with the number of connected users, but two different types of mask processing for privilege levels "2" and "3" need only be prepared. That is, one unmasked image data and two different masked image data are generated, and are transferred to the corresponding clients as the connection destinations.

Since the masked region is included in an image actually sensed by the camera and displayed on the display screens of the clients of privilege levels "2" and "3", for example, an image which has a message "an image within this region cannot be displayed" or the like added to the masked region to may be transmitted.

Figure 20:
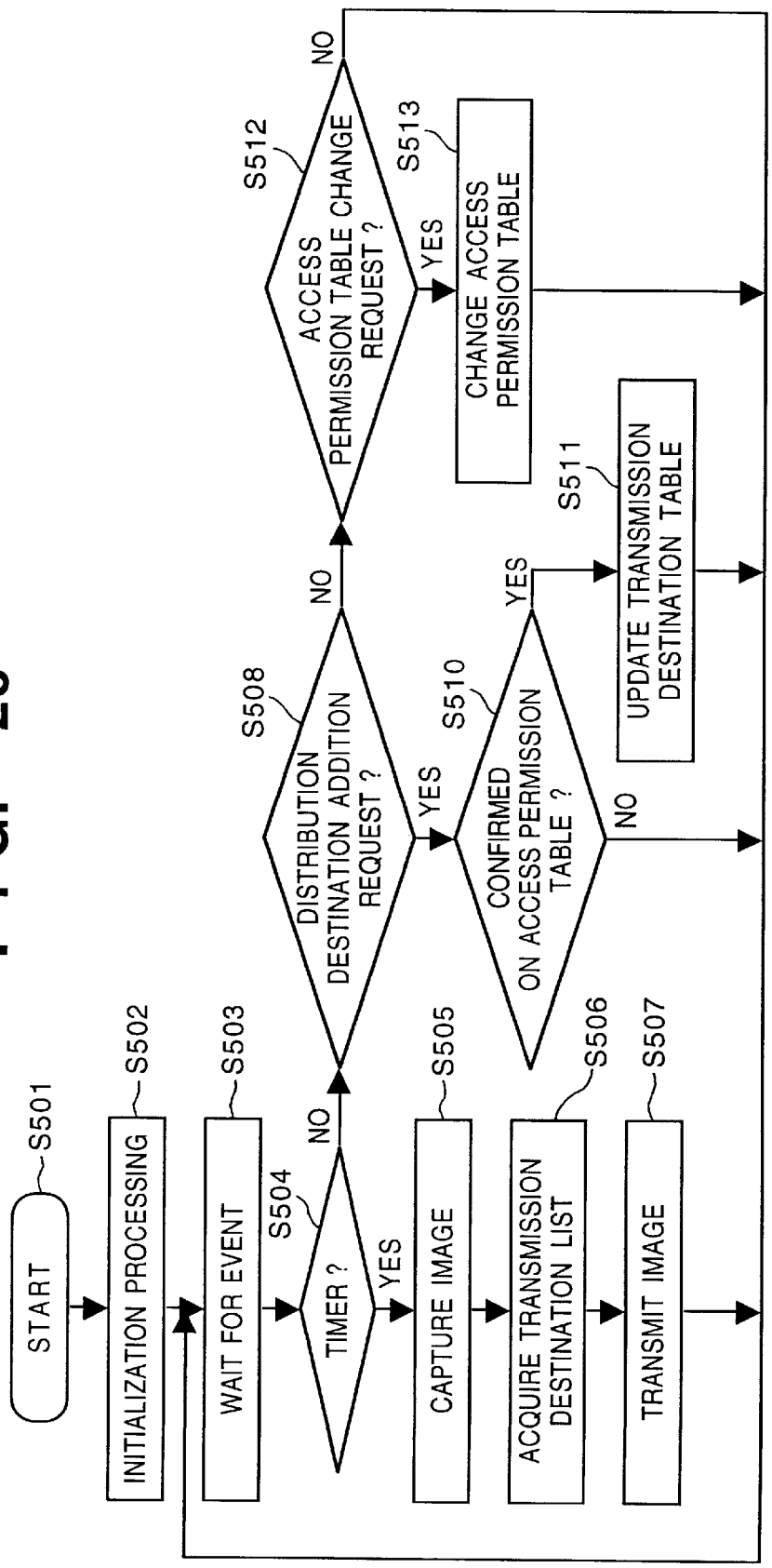
FIG. 20 is a flow chart of a video transmission server of the second embodiment.

In step S503 in FIG. 20, generation of an event is determined when an event is generated by a timer (not shown) when the image capture timing has reached, when a distribution destination addition request is received (a new client is connected), or when an access permission table change request (registration, deletion, and the like of privilege level and user name) is received.

When a distribution destination addition request is received, the flow advances from step S508 to step S510 to check with reference to the permission table 1-132 if the user is an authorized user. If YES in step S510, the flow advances to step S511 to add the information of that user to the transmission destination table 1-134.

On the other hand, if the access permission table change request (an instruction from a console (not shown) or a request from the user with privilege level "1") is received, the flow advances from step S512 to step S513 to update (add or delete) the contents of the permission table 1-132.

Figure 24:
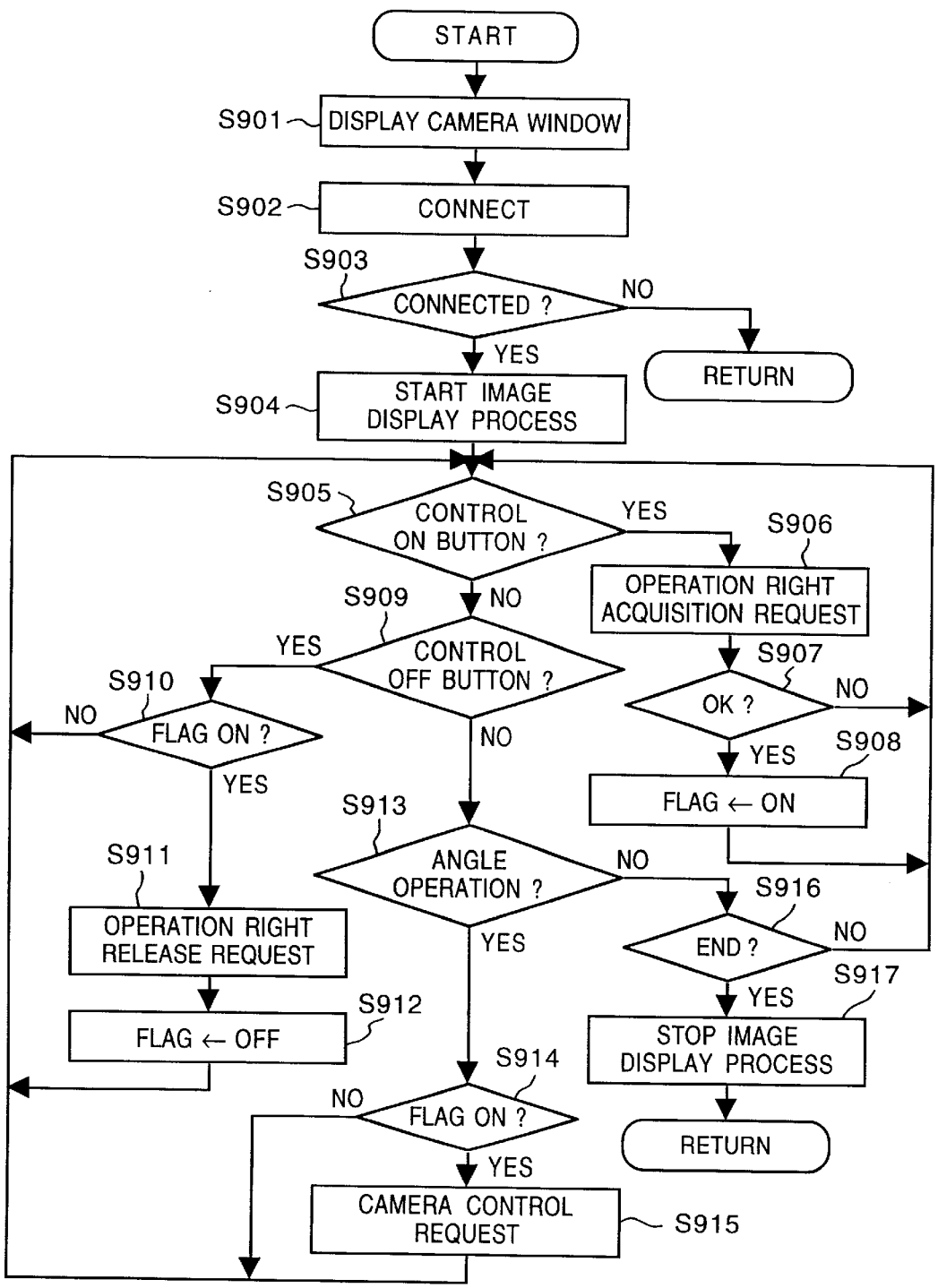
FIG. 24 is a flow chart showing the operation processing contents of a camera client in the second embodiment.
Figure 25:
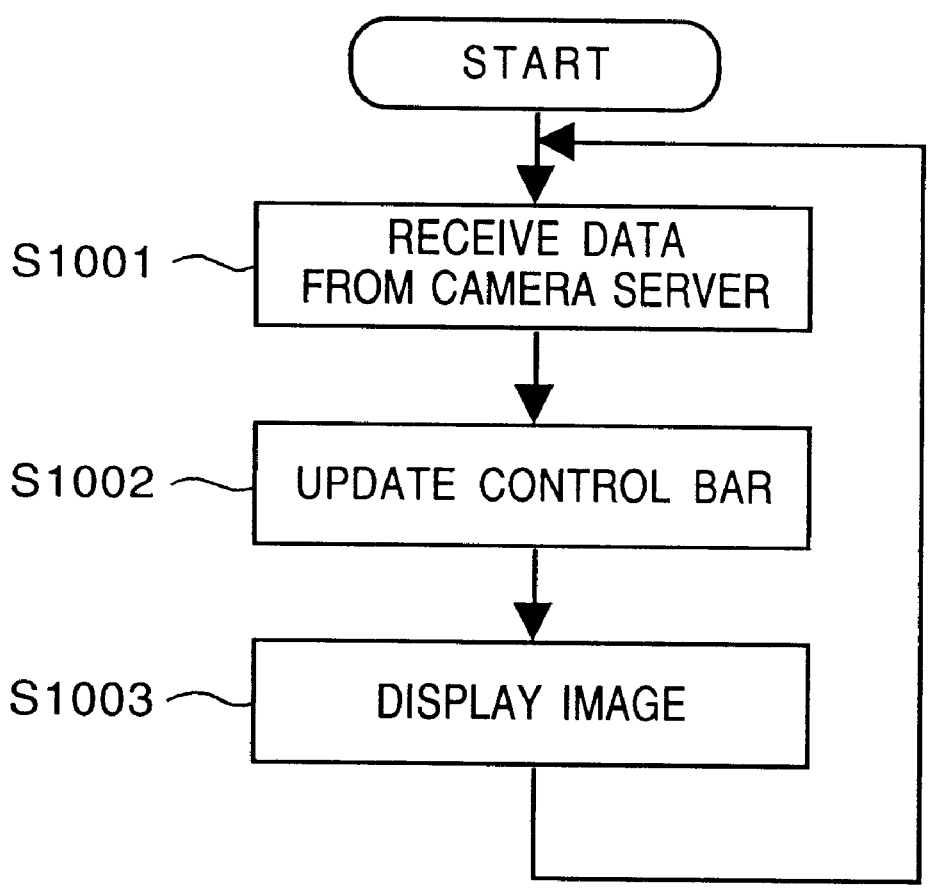
FIG. 25 is a flow chart showing the operation processing contents of the camera client in the second embodiment.

The operation of the camera client will be described below with reference to the flow charts in FIGS. 24 and 25.

The processing contents of the camera control process 3-22 will be described below with reference to FIG. 24.

When the camera control process 3-22 is started, initialization is done in step S901, and the window 2-3 shown in FIG. 17 is displayed.

The flow advances to step S902 to establish connection to a desired camera server. It is then checked in step S903 if the connection is successful. If NO in step S903, this processing ends.

On the other hand, if YES in step S903, the image display process 3-31 is started (the image display process 3-31 will be described later with reference to FIG. 25). In this manner, the process for displaying an image transferred from the camera server is executed, and the image can be displayed.

In steps S905, S909, S913, and S916, operations at the window 2-3 are monitored.

For example, if it is determined that the control ON button 2-24 is clicked, the flow advances to step S906 to transfer an acquisition request for the right of operation to the connected camera server. It is then checked in step S907 if the right of operation is given. If YES in step S907, the flow advances to step S908 to turn on the flag for managing the presence/absence of the right of operation.

If it is determined that the control OFF button 2-25 is clicked, the flow advances to step S910 to check if the flag is ON. If the flag is kept OFF, since the user has no right of operation from the start, the flow returns to step S905. On the other hand, if the flag is ON, a release request for the right of operation is transferred to the connected camera server and the flag is turned off.

If it is determined that the camera angle operation (one of the buttons 2-26a to 2-26d and the scroll bars 2-21, 2-22, and 2-23) is made, the flow advances to step S914. Only when it is determined in step S914 that the flag is ON, the camera control contents corresponding to the operation are transferred to the connected camera server. However, when the black region is operated, as shown in FIG. 17, the operation contents are ignored.

If an instruction to end this processing is received, the flow advances from step S916 to step S917. In step S917, the image display process is stopped and this processing ends.

The operation processing sequence of the image display process 3-31 will be described below with reference to the flow chart in FIG. 25.

In step S1001, data from the camera server is received. Since the header of the received data includes the angle information (the pan angle, tilt angle, zoom value, and information indicating their allowable ranges) of the camera that senses the image, processing for setting the know positions of the scroll bars and painting inaccessible regions for the knobs in black as shown in FIG. 17 is done on the basis of such information in step S1002.

The flow then advances to step S1003, and compressed data sent after the header is expanded to display an image on the image window 2-1.

As described above, according to this embodiment, the authorized limits of the right of camera operation in the camera server to which a plurality of clients are connected are classified into ranks, and the camera control can be done within the allowable range of the rank.

In this embodiment, an application example in, e.g., an office has been exemplified. However, a camera server may be set on the Internet which has been receiving a lot of attention recently, and may be open to the public. In this case, since TCP/IP is used as a network protocol, the user names are managed using IP addresses. Since many and unspecified users need be allowed to log in the server, it is practically difficult to prepare a permission table in units of individual users. For this reason, privilege level "4" may be uniquely assigned to unauthorized users (clients).

Like in this embodiment, when a camera client with privilege level "2" or "3" accesses an image, the camera access range is limited to prevent leakage of images to be kept secret. Also, when a group with privilege level "1" accesses an image, since the camera control range is not limited, they can freely control the camera, thus achieving both high security and distribution of information.

In this embodiment, three different access permission groups are set. Alternatively, four or more groups may be set, and the camera control range is changed in correspondence with these groups, thus achieving both higher security and distribution of information.

In the second embodiment, an image pickup inhibited region is assured at the end portion of a potential image pickup grant range (the field of view that can be pickup image when the pan and tilt angles are changed at a minimum magnification) of the camera. As in the first embodiment, an image pickup inhibited region may be assured at the center of the potential pickup grant range.

Furthermore, in the second embodiment, the maximum zoom value is set to become gradually smaller toward the end of the view field range. Alternatively, it is free to set the maximum zoom value in an arbitrary direction in the image pickup grant range.

Also, as in the first embodiment, the second embodiment can be applied to a case wherein a plurality of microphones are set as well as cameras.

Each microphone is preferably mounted on a single panhead together with the camera. As compared to independent operation control of the microphone and camera, the control can be simplified, and the client can naturally hear sound corresponding to the direction of the camera that picks up an image.

When microphones are used in the second embodiment, if the privilege level of the connected user is, e.g., "3", the camera server inhibits audio data from being transferred upon transferring of an image in an image pickup inhibited region for that user. Of course, audio data is transmitted to users with privilege levels "2" or "1" if no image pickup inhibited region is present for those users.

<Third Embodiment>

In the third embodiment, in place of limiting the camera control range in the above embodiment (second embodiment), when a camera operation is made beyond the camera control range, an image is blurred by executing processing for intentionally defocusing the image or lowering the resolution of the image (e.g., by applying a mosaic pattern). When the image is intentionally defocused, if it is determined in step S415 that a camera access is to made beyond the camera control range, the image is intentionally defocused to disturb its contents in place of changing the camera control command to fall within the camera control range. If the camera access returns to fall within the control range, a focus is brought to the image by auto-focusing, and an accurate image is transmitted.

If mosaic processing is done in place of defocusing, an image size as a mosaic processing unit can be changed like in the setting range of the zoom value shown in FIG. 23. More specifically, in the case of a user with privilege level "2", a region 87 in an image photographed by the camera is not modified at all. As for an image in a region 88, average values Pav are calculated in units of m0×n0 pixels Pi,j (i=1, ..., m0, j=1, ..., n0), and all converted pixels Qi, are output as Pav. Also, for a region 89, the same processing is done for m1×n1 pixels. Of course, m1>m0, and n1>n0.

Figure 26:
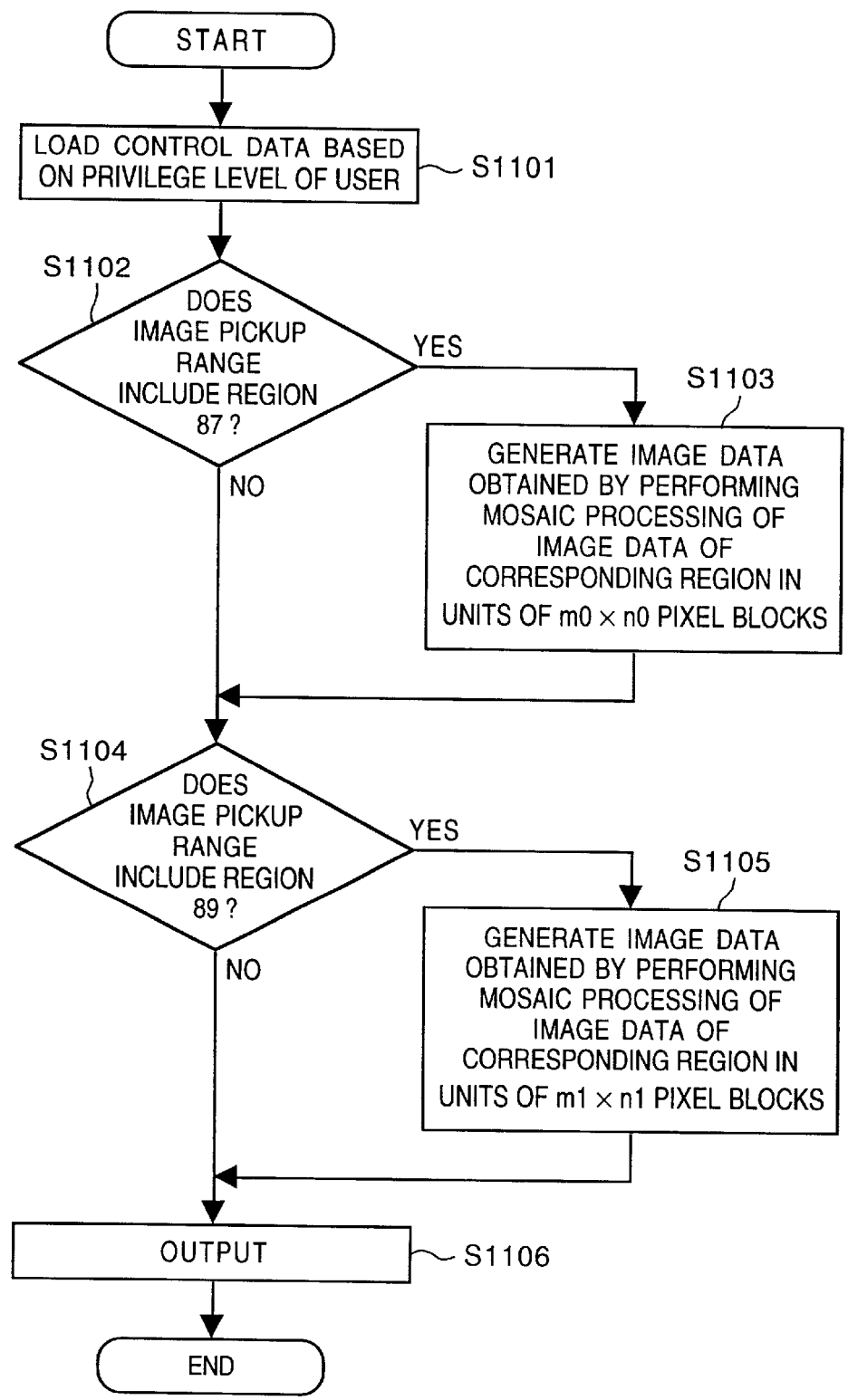
FIG. 26 is a flow chart showing the mosaic processing contents in the third embodiment.

In this case, the image transmission server process 3-11 of the camera server executes processing shown in FIG. 26 in units of privilege levels when picked up image data is transferred to the clients connected at that time.

The processing will be described below with reference to FIG. 26.

In step S1101, the privilege level of one connected client is detected, and control data according to the detected privilege level is read. The control data specifies three regions, as shown in the lower portion in FIG. 23 described above in the second embodiment.

The flow advances to step S1102 to check based on the pan angle, tilt angle, and zoom value upon pickup image if the image includes the region 88 in FIG. 23. If YES in step S1102, the flow advances to step S1103. In step S1103, a portion corresponding to the region 88 in the pickup image (image data) is extracted in units of m0×n0 pixels, and their average values are calculated to replace the extracted pixel values.

In step S1104, it is checked based on the pan angle, tilt angle, and zoom value upon pickup image if the pickup image includes the region 89 shown in FIG. 23. If YES in step S1104, the flow advances to step S1105. In step S1105, a portion corresponding to the region 89 in the pickup image (image data) is extracted in units of m1×n1 pixels, and their average values are calculated to replace the extracted pixel values. As described above, m1>m0, and n1>n0.

As a result of the above-mentioned processing, since a maximum of three transmission image data (at least one image data) are generated, the image corresponding to the privilege level of that user is compressed and transferred (step S1106).

According to this embodiment, when an image at a position beyond the camera control range is to be transmitted, an image to be transmitted is not too clear to show its secrecy but is clear enough to reveal its atmosphere. For this reason, both high security and the freedom in image access can be achieved with a good balance.

The above-mentioned processing is performed in units of privilege levels of the users, and the size and position of the image region to be subjected to the mosaic processing vary in units of privilege levels. Hence, the quality of an image that can be observed by a user with privilege level "2" may be set to be different from that of an image for privilege level "3".

More specifically, it is possible to supply an image with lower quality (i.e., an image with a larger out-of-focus state) than that for the user with privilege level "2" to the user with privilege level "3".

<Fourth Embodiment>

In the fourth embodiment, in place of forcibly defocusing an image in the third embodiment, when a camera access is made beyond the camera control range, an image processing function for making an image from the image transmission server process unclear is added.

That is, when a camera access is made beyond the camera control range, only images to be transmitted to camera clients other than that with privilege level "1" are subjected to processing for making an image unclear.

In this embodiment, between steps S506 and S507 in the flow chart in FIG. 20, it is checked if the transmission destination of an image belongs to a group with privilege level "1". If the destination belongs to that group, the image is directly transmitted; otherwise, the image is blurred by filtering it through a low-pass filter.

As another implementation method, an image conversion server process is arranged in the camera server 1-1 in addition to the image transmission server process, and when the transmission destination does not belong to a group with privilege level "1", the image may always be output via this image conversion server. In this case, the image conversion server lowers the resolution of the image.

According to the present embodiment, upon transmission of an image in a portion beyond the camera control range, an image to be transferred to a specific user is not too clear to show its secrecy but is clear enough to reveal its atmosphere, and a clear image can be transmitted to another specific user. Hence, both high security and the freedom in image access can be achieved with a good balance.

<Fifth Embodiment>

In the third embodiment described above, image data are generated in correspondence with the number of different privilege levels, i.e., privilege levels "1", "2", and "3", and these images are transferred to the clients. In this case, three different images must be generated in each image transfer.

In view of this problem, in the fifth embodiment, the transmission server process of the camera server transmits an image corresponding to a user with the lowest privilege level (in this embodiment, the user with privilege level "3" has the lowest level) among all the users connected at that time to all the user's terminals.

As a result, only one type of image data can be transferred, and the load on the camera server can be reduced.

Figure 27:
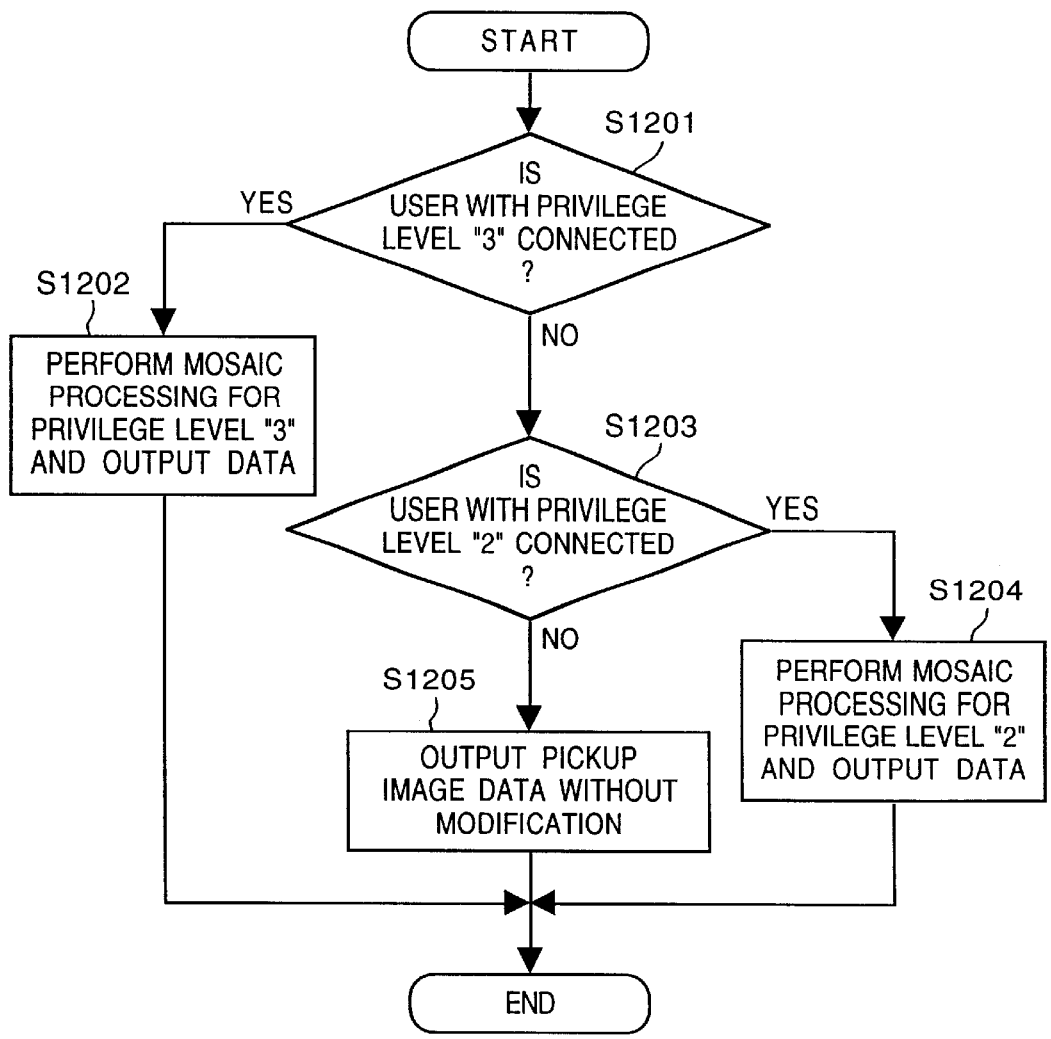
FIG. 27 is a flow chart showing the processing contents of a camera server in the fifth embodiment.

FIG. 27 is a flow chart showing processing for generating data to be transferred in the fifth embodiment.

In step S1201, it is checked if the currently connected clients include a user with privilege level "3". If at least one user with privilege level "3" is found, the flow advances to step S1202, and control data (i.e., data for specifying the regions 86, 87, and 89 in FIG. 23) corresponding to privilege level "3" is read out. Image data to be transferred is generated from original image data on the basis of the readout data and angle information upon pickup image, and is transmitted and output to the individual clients.

If the connected users do not include any user with privilege level "3", the flow advances to step S1203. It is checked in step S1203 if the connected users include a user with privilege level "2". If such user is found, the flow advances to step S1204 to read out control data for privilege level "2". Image data to be transferred is generated from original image data on the basis of the readout control data and angle information upon pickup image, and is transmitted and output to the individual clients.

On the other hand, if it is determined that the connected users are only those with privilege level "1", the photographed image data is transferred to the individual clients without being modified.

As a result of the above-mentioned processing, since the camera server need only generate one type of image data to be transferred alone, the load on the server can be reduced.

In the second to fifth embodiments, transfer of an image photographed by the camera has been described. As in the first embodiment, audio data may be transferred together. In this case, a microphone is preferably mounted on a single panhead together with a camera. Since the directions of the camera and microphone always agree with each other, the control can be simplified.

When the microphone is applied to the second, third, and fourth embodiments, since the image pickup inhibited region differs in units of privilege levels of the users, audio data can be inhibited from being transferred if an image including an image pickup inhibited region is transferred to the clients. Of course, audio data can be transferred to users with privilege level "1" all the time.

Furthermore, the second to fifth embodiments are particularly effective for a relatively large-scale system. Also, as in the first embodiment, a camera management server that manages the camera servers may be set.

The camera server in each of the above embodiments requires a hardware arrangement that connects a video camera to capture an image and a hardware arrangement that realizes a network, and the camera client requires a hardware arrangement that implements the network. However, basically, these server and client can be implemented by application programs that run on a personal computer or workstation.

Hence, the present embodiments are also achieved by supplying a storage medium, which records a program code of a software program that can realize the functions of the above-mentioned embodiments to a system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As described above, according to the second to the fourth embodiments, clients are managed in units of a plurality of groups, and a client who belongs to each group is allowed to control a camera within the control range of that group.

Also, a camera client connected to a camera server can confirm the limitation contents.

As many apparently widely different embodiments of the present invention can be made without departing from the spirit and scope thereof, it is to be understood that the invention is not limited to the specific embodiments thereof except as defined in the appended claims.

What is claimed is:

1. A camera control system, which has a camera, an angle of which can be controlled, is connected to a predetermined network, and transfers a pickup image by the camera to clients on the network to display the image on display screens of the client devices, comprising:

storage means for storing information indicating levels in units of clients on the network, and information indicating image display inhibited regions for substantially inhibiting displaying image pickup by the camera in units of levels;

detection means for detecting a level of the connected client by referring to said storage means;

determination means for determining if an image pickup range includes the image display inhibited region corresponding to the level of the client; and inhibition means for, when said determination means determines that the image pickup range includes the image display inhibited region, inhibiting displaying an image corresponding to the image display inhibited region by processing the image picked up by the camera.

2. The system according to claim 1, wherein said inhibition means includes modification means for modifying an image in a region corresponding to the image display inhibited region in the pickup image to image quality corresponding to a level of the connected client.

3. The system according to claim 2, wherein said modification means comprises mask means for masking an image.

4. The system according to claim 2, wherein said modification means comprises mosaic means for applying a mosaic pattern to an image, and a pixel block size of the mosaic pattern becomes larger for a client with lower level.

5. A camera control system, which has a camera, an angle of which can be controlled, is connected to a predetermined network, and transfers an image pickup by the camera to clients on the network to display the image on display screens of the client devices, comprising:

storage means for storing information indicating levels in units of clients on the network, and information indicating image display inhibited regions for substantially inhibiting displaying image picked up by the camera in units of levels;

detection means for detecting a level of the connected client by referring to said storage means;

determination means for determining if an image pickup range includes the image display inhibited region corresponding to the level of the client; and inhibition means for, when said determination means determines that the image pickup range includes the image display inhibited region, inhibiting displaying an image corresponding to the image display inhibited region by processing the image picked up by the camers in units of users of the level.

6. The system according to claim 5, wherein said inhibition means includes modification means for modifying an image in a region corresponding to the image display inhibited region in the pickup image to image quality corresponding to a level of the connected client.

7. The system according to claim 6, wherein said modification means comprises mask means for masking an image.

8. The system according to claim 6, wherein said modification means comprises mosaic means for applying a mosaic pattern to an image, and a pixel block size of the mosaic pattern becomes larger for a client with lower level.

9. The system according to claim 6, further comprising audio detection means for detecting sound, and wherein when said determination means determines the image pickup range includes the image display inhibited region, said inhibition means also inhibits audio information detected by said audio detection means from being transferred.

10. The system according to claim 9, wherein said audio detection means includes a microphone, a directivity, detection direction, and input sensitivity of which can be controlled, at least the detection direction being changed in correspondence with an image pickup direction of the camera.

11. A camera control system, which has a camera, an angle of which can be controlled, is connected to a predetermined network, and transfers an image pickup by the camera to clients on the network to display the image on display screens of the client devices, comprising:

storing means for storing information indicating levels in units of clients on the network, and information indicating image display inhibited regions for substantially inhibiting displaying image picked up by the camera in units of levels;

detection means for detecting a lowest level amoung connected clients by referring to said storage means;

determination means for determining if an image pickup range includes the image display inhibited region corresponding to the level detected by said detection means; and inhibition means for, when said determination means determines that the image pickup range includes the image display inhibited region, inhibiting displaying an image corresponding to the image display inhibited region by processing the image picked up by the camera in units of users of the level.

12. The system according to claim 11, wherein said inhibition means includes modification means for modifying an image in a region corresponding to the image display region in the picked up image to image quality corresponding to the detected lowest level.

13. The system according to claim 12, wherein said modification means comprises mosaic means for applying a mosaic pattern to an image, and a pixel block size of the mosaic pattern becomes larger for a client with lower level.

\*\*\*\*\*\*further comprising status information transmission means for transmitting information indicating the audio detection characteristics of said microphone and angle information of the camera to the connected clients, and wherein each of the clients displays camera and microphone icons on a predetermined map on the basis of the received angle information of the camera and the audio detection characteristic information of said microphone.

14. The system according to claim 11, further comprising audio detection means for detecting sound, and wherein said determination means determines that the image pickup range includes the image display inhibited region, said inhibition means also inhibits audio information detected by said audio detection means from being transferred. \*\*\*\*\*\*\*\*an angle of which can be controlled, is connected to a predetermined network, and transfers an image pickup by the camera to clients on the network to display the image on display screens of the client devices, comprising:

storage means for storing information indicating levels in units of clients on the network, and information indicating image pickup inhibited regions for substantially inhibiting pickup image in units of levels;

detection means for detecting a lowest level among the connected clients by referring to said storage means;

determination means for determining if an image pickup range includes the image pickup inhibited region corresponding to the level detected by said detection means; and inhibition means for, when said determination means determines that the image pickup range includes the image pickup inhibited region, inhibiting image data corresponding to the image pickup inhibited region in the image to be picked up from being transferred in units of users of the level.

15. The system according to claim 14, wherein said audio detection means includes a microphone, audio detection characteristics including a directivity, detection direction, and input sensitivity of which can be controlled, at least the detection direction being changed in correspondence with an image pickup direction of the camera.

16. The system according to claim 15, further comprising status information transmission means for transmitting information indicating the audio detection characteristics of said microphone and angle information of the camera to the connected clients, and wherein each of the clients displays camera and microphone icons on a predetermined map on the basis of the received angle information of the camera and the audio detection characteristic information of said microphone.

17. A storage medium readable by a machine, tangibly embodying a program means for controlling a remote camera server, with a camera, on a network and transferring an image from said camera for receiving and displaying by a connected client on the network comprising:

storage means for storing group level information for each client on the network and group level control limitation information associated with each group level; detection means for detecting a group level to which a connected client belongs by referring to said group level information stored by said storage means;

determination means for determining the group level control information stored by said storage means and associated with said group level detected by said detection means; and, control means for allowing said connected client detected by said detection means to receive and display images transferred by said camera of said remote camera server in accordance with the group level control limitation information determined by said determination means.

18. A method for controlling a camera system, which has a camera, an angle of which can be controlled, is connected to a predetermined network, and transfers an image pickup by the camera to clients on the network to display the image on display screens of the client device, comprising:

a storage step for storing information indicating levels in units of clients on the network, and information indicating image display inhibited regions for substantially inhibiting displaying image picked up by the camera in units of levels;

a detection step for detecting a lowest level among the connected clients by referring to the information stored in the storage step;

a determination step for determining if an image pickup range includes the image display inhibited region corresponding to the level detected in the detection step; and an inhibition step for, when said determination step determines that the image pickup range includes the image display inhibited region, inhibiting displaying an image corresponding to the image display inhibited region by processing the image picked up by the camera in units of users of the level.

19. The method according to claim 18, wherein said inhibition step includes a modification step for modifying an image in a region corresponding to the image pickup inhibited region in the picked up image to image quality corresponding to the detected lowest level.

20. The method according to claim 19, wherein said modification step comprises a mosaic step for applying a mosaic pattern to an image, and a pixel block size of the mosaic pattern becomes larger for a client with lower level.

21. The method according to claim 18, further comprising an audio detection step for detecting sound; and wherein when said determination step determines that the image pickup range includes the image pickup inhibited region, said inhibition step also inhibits audio information detected by said audio detection step from being transferred.

22. The method according to claim 21, wherein said audio detection step includes a microphone, audio detection characteristics including a directivity, detection direction, and input sensitivity of which can be controlled, at least the detection direction being changed in correspondence with an image pickup direction of the camera.

23. The method according to claim 22, further comprising a status information transmission step for transmitting information indicating the audio detection characteristic of said microphone and angle information of the camera to the connected clients; and wherein each of the clients displays camera and microphone icons on a predetermined map on the basis of the received angle information of the camera and the audio detection characteristic information of said microphone.

24. A program storage device readable by a machine, tangibly embodying a method for controlling a camera system, which has a camera, an angle of which can be controlled, is connected to a predetermined network, and transfers an image pickup by the camera to clients on the network to display the image on display screens of the client device, comprising:

a storage step for storing information indicating levels in units of clients on the network, and information indicating image display inhibited regions for substantially inhibiting displaying image picked up by the camera in units of levels;

a detection step for detecting a lowest level among the connected clients by referring to the information stored in the storage step;

a determination step for determining if an image pickup range includes the image display inhibited region corresponding to the level detected in the detection step; and an inhibition step for, when said determination step determines that the image pickup range includes the image display inhibited region, inhibiting displaying an image corresponding to the image display inhibited region by processing the image picked up by the camera in units of users of the level.

25. The device according to claim 24, wherein said inhibition step includes a modification step for modifying an image in a region corresponding to the image pickup inhibited region in the picked up image to image quality corresponding to the detected lowest level.

26. The device according to claim 25, wherein said modification step comprises a mosaic step for applying a mosaic pattern to an image, and a pixel block size of the mosaic pattern becomes larger for a client with lower level.

27. The device according to claim 24, further comprising an audio detection step for detecting sound; and wherein when said determination step determines that the image pickup range includes the image pickup inhibited region, said inhibition step also inhibits audio information detected by said audio detection step from being transferred.

28. The device according to claim 27, wherein said audio detection step includes a microphone, audio detection characteristics including a directivity, detection direction, and input sensitivity of which can be controlled, at least the detection direction being changed in correspondence with an image pickup direction of the camera.

29. The device according to claim 28, further comprising a status information transmission step for transmitting information indicating the audio detection characteristic of said microphone and angle information of the camera to the connected clients; and wherein each of the clients displays camera and microphone icons on a predetermined map on the basis of the received angle information of the camera and the audio detection characteristic information of said microphone.

30. A camera control system, which has a camera, an angle of which can be controlled, is connected to a predetermined network, and transfers a pickup image by the camera to clients on the network to display the image on display screens on client devices, comprising:

a storage unit which stores information indicating levels in units of clients on the network, and information indicating image display inhibited regions for substantially inhibiting displaying the image pickup by the camera in units of levels; and a control unit arranged to detect a level of the connected client by referring to said storage unit to determine if an image pickup range includes the image display inhibited region corresponding to the level of the client, when said control unit determines that the image pickup range includes the image display inhibited region, said control unit inhibits displaying an image corresponding to the image display inhibited region by processing the image picked up by the camera.

31. The system according to claim 30, wherein said control unit modifies an image in region corresponding to the image display inhibited region in the pickup image to image quality corresponding to a level of the connected client.

32. A method for controlling a camera system, which has a camera, an angle of which can be controlled, is connected to a predetermined network, and transfers an image pickup by the camera to clients on the network to display the image on display screens of the client devices, comprising:

a storage step of storing information indicating levels in units of clients on the network, and information indicating image display inhibited regions for substantially inhibiting displaying image by the camera in units of levels;

a detection step of detecting a level of the connected client by referring to the information stored in said storage step;

a determination step of determining if an image pickup range includes the image display inhibited region corresponding to the level detected in the detection step; and an inhibition step of, when said determination step determines that the image pickup range includes the image display inhibited region, inhibiting displaying an image data corresponding to the image display inhibited region by processing the image picked up by the camera.

33. A control apparatus, which is connected to a camera, transfers a pickup image by the camera to clients on a network to display the image on a display screen on the clients, comprising:

a storage device which stores information about clients and image-modified regions which are modified in an image picked up by the camera corresponding to each client; and a control unit arranged to modify the image corresponding to an image-modified region in accordance with detecting an image modified region corresponding to a connected client referring to said storage device.

34. The apparatus according to claim 33, wherein a field of view of the camera is operated by each client.

35. The apparatus according to claim 34, wherein said control unit modifies the image corresponding to operating the field of view of the camera.

36. The apparatus according to claim 33, wherein said control unit modifies the image by masking an image in the image-modifed region.

37. The apparatus according to claim 33, wherein said control unit modifies the image by applying a mosaic pattern to an image in the image-modified region.

38. The apparatus according to claim 33, wherein said control unit modifies the image corresponding to a level of the connected client.

39. The apparatus according to claim 33, wherein said control unit modifies resolution of the image in the image-modified region corresponding to the connected client.

40. The method according to claim 33, wherein the image is modified by applying a mosaic pattern to an image in the image-modified region.

41. The method accoridng to claim 33, wherein the image is modified corresponding to a level of the connected client.

42. The method according to claim 33, wherein the resolution of the image in the image-modified region is modified corresponding to the connected client.

43. A method for controlling a transfer of a pickup image by a connected camera to clients on a network to display the image on a display screen on the clients, comprising:

detecting an image-modified region corresponding to a connected client referring to a storage unit which stores information about clients and image-modified regions which are modified in an image picked up by the camera corresponding to each client;

modifying the image corresponding to an image-modified region in accordance with detecting an image-modified region corresponding to a connected client referring to said storage unit.

44. The method according to claim 43, wherein a field of view of the camera is operated by each client.

45. The method according to claim 43, wherein the image is modified corresponding to operating the field of view of the camera.

46. The method according to claim 43, wherein the image is modified by masking an image in the image-modified region.

47. A storage medium that stores a program to make a control apparatus transfer of an image picked up by a camera to clients, storing program for, detecting an image-modified region corresponding to a connected client referring to a storage unit which stores information about clients and image-modified regions which are modified in an image picked up by the camera corresponding to each client;

modifying the image corresponding to an image-modified region in accordance with detecting an image-modified region corresponding to a connected client referring to said storage unit.

48. The storage medium according to claim 47, wherein a field view of the camera is operated by each client.

49. The storage medium according to claim 47, wherein the image is modified corresponding to operating the field of view of the camera.

50. The storage medium according to claim 47, wherein the iamge is modified by masking an image in the image-modified region.

51. The storage medium according to claim 47, wherein the image is modified by applying a mosaic pattern to an image in the image-modified region.

52. The storage medium according to claim 47, wherein the iamge is modified corresponding to a level of the connected client.

53. The storage medium according to claim 47, wherein resolution of the image in the image-modified region is modified corresponding to the connected client.

* * * * *

UNITED STATES PATENT AND TRADEMARK OFFICE
CERTIFICATE OF CORRECTION

PATENT NO.   : 6,529,234 B2                                           Page 1 of 1
DATED        : March 4, 2003
INVENTOR(S)  : Shinya Urisaka et al.

It is certified that error appears in the above-identified patent and that said Letters Patent is hereby corrected as shown below:

Title page,
Item [56], References Cited, U.S. PATENT DOCUMENTS, please add:
-- 6,208,379   03/2001      Oya et al.             348/213
   6,055,014   04/2000      Hosonuma et al.        348/143 --

Column 3,
Line 35, please delete "113" and insert therefore -- 108 --.

Column 25,
Line 51, please delete "storing" and insert therefore -- storage --.

Column 26,
Delete lines 10-18.
Line 25, please delete "******** an angle of which can".
Delete lines 26-45.

Column 30,
Line 10, after "wherein" please delete "the".

Signed and Sealed this

Twenty-third Day of September, 2003

JAMES E. ROGAN
*Director of the United States Patent and Trademark Office*